United States Patent [19]

Peranio

[11] Patent Number: 4,957,624
[45] Date of Patent: Sep. 18, 1990

[54] METHOD OF AND ARRANGEMENT FOR PURIFYING CONTAMINATED WATER

[75] Inventor: Anthony Peranio, Nyack, N.Y.

[73] Assignee: Purewater Sciences International, Inc., New York, N.Y.

[21] Appl. No.: 54,571

[22] Filed: May 27, 1987

Related U.S. Application Data

[63] Continuation-in-part of Ser. No. 872,162, Jun. 9, 1986, abandoned.

[51] Int. Cl.$^5$ .............................................. C02F 1/02
[52] U.S. Cl. .................................... 210/129; 210/138; 210/143; 210/180; 210/181; 210/184; 210/196; 210/257.1
[58] Field of Search ..................... 210/96.1, 123, 138, 210/143, 167, 181, 184, 186, 257.1, 436, 472, 128, 129, 180, 196, 258, 259, 261, 262, 266; 99/314

[56] References Cited

U.S. PATENT DOCUMENTS

| | | | |
|---|---|---|---|
| 274,048 | 3/1883 | Stilwell | 210/167 |
| 831,886 | 9/1906 | Moffat | 210/184 |
| 1,488,696 | 4/1924 | Moffat | 210/185 |
| 2,275,746 | 3/1942 | Edwards | 210/481 |
| 2,388,335 | 11/1945 | McCullough | 210/481 |
| 2,425,848 | 8/1947 | Vawter | 210/181 |
| 2,866,401 | 12/1958 | Sidell | 99/312 |
| 3,045,827 | 7/1962 | Hough | 210/110 |
| 3,396,654 | 8/1968 | Heden | 99/314 |
| 3,676,307 | 7/1972 | Black | 203/20 |
| 3,991,664 | 11/1976 | Yamato | 99/314 |
| 4,518,503 | 5/1985 | Fermaglich | 210/186 |

Primary Examiner—Ivars Cintins
Attorney, Agent, or Firm—Louis Weinstein

[57] ABSTRACT

Contaminated water is purified by introduction into a filter, filtering the water, accumulating the partially purified water delivered from the filter, heating the collected water to a temperature near its boiling point, reintroducing the collected water into the same filter, and continuously repeating the filtering, accumulation and heating steps with attendent further purification, until the degree of contamination of such water has dropped below a predetermined level. A predetermined portion of the purified water may be distilled subsequent to the completion of the purification operation, and the distilled water is collected for eventual consumption. An arrangement for performing the above method includes a vessel (9) have a filter (7) arranged at its upper region (20) (9a), and a lid (3) removably supported on the vessel and may include a jet deflector (100) for providing more uniform flow of slugs and water vapor to the filter inlet. An electric resistance heater (10) arranged either inside of or external to the vessel (FIG. 2), and a riser tube (16), which may have a steam collecting bell (14) at its lower end, delivers water slugs and water vapor to the filter. The riser tube may also be inside of or external to the vessel and include a mechanical pump (53) in place of thermal pumping action. The vessel may communicate with a steam condensing receptacle (45) to provide distilled water (46). A control system (111) may be provided for automating the purification cycle and may further incorporate an additional storage tank (126) for delivering purified water in a substantially continuous manner.

34 Claims, 8 Drawing Sheets

METHOD OF AND ARRANGEMENT FOR PURIFYING CONTAMINATED WATER

BACKGROUND OF THE INVENTION

This application is a continuation-in-part of application Ser. No. 872,162, filed June 9, 1986.

The present invention relates to water purification in general, and more particularly to a method of and an arrangement for purifying contaminated water.

The invention described here is designed to produce really safe drinking water, costing only pennies per gallon of water, not only from all municipally treated water supplies, but also from water drawn from wells or springs and other water sources, preferably such which provide water that is not excessively contaminated. The present invention is based on the recognition of the fact that tap water, even though claimed or presumed to be safe for human consumption, often contains a considerable amount of contaminants or pollutants which may at least detract from the esthetic appeal of the tap water by discoloring or clouding it, or by giving it an unpleasant odor or taste, if not being actually harmful or toxic. This is true in spite of, and at least in some instances because of the fact that the municipal tap water is chlorinated, sometimes very heavily, to rid it of harmful organisms, such as bacteria or the like. The problem of tap water contamination is exacerbated by the fact that especially large municipalities, like New York City, have to use river water, such as that of the Hudson River, particularly during severe or persistent drought conditions, to replenish their reservoirs. Such river water contains all kinds of contaminants, such as polychlorobiphenyls (PCB's) or other carcinogenic compounds, and various industrial and domestic wastes (with or without treatment) have also found their way into the river. Furthermore, the river water is already rather rich in natural organic material and bacterial and other biological contaminants.

Obviously, the river water is not suited for consumption without treatment. Thus, such river water is usually chlorinated before it is admitted into the reservoirs, and the water supplied from the reservoirs into the aqueducts is chlorinated again. However, the act of chlorination, as effective as it may be in killing most of the harmful organisms, especially when applied to polluted water, produces cancer-causing trihalomethanes. In addition thereto, at least in some of the older municipal water supply systems, bacterial infestation of the distribution piping by organisms against which chlorine is ineffective can cause dangerous pollution. Giardia lamblia cysts which can cause infection of the small intestine are an example of such harmful and chlorine-resistant organisms. Also, toxic or otherwise harmful substances, such as lead, copper, zinc or asbestos can be introduced into the previously treated water in the distribution piping.

Additionally, industrial discharges of highly toxic organic compounds, and the agricultural use of pesticides, herbicides, fungicides and similar substances, not to mention the variety of dangerous chemicals used in our homes, can pollute the water. High levels of common salt and other sodium ion salts, from the intrusion of sea water, for instance, or introduced by certain water softeners and treatment methods, can cause undesirably high levels of sodium in drinking water. Other contaminant salts include nitrates which can cause methemoglobemia (or "blue babies"), and fluorides which can cause teeth mottling and bone disorders. High nitrate concentration can result from water source contamination by human and animal sewage or, especially in inland and arid regions, can be the result of natural (geological) pollution. Fluoride contamination can also result either from human activity, or from natural contamination. Then there are toxic heavy metal salts which are widely used in or are by-products of certain processes performed by industrialized societies. Such heavy metal salts include, for instance, the salts of cadmium, chromium, nickel, lead and arsenic (which also causes cancer). Finally, in this day and age of nuclear weapon production, testing, and previous use in warfare, as well as nuclear power generation and accidents, and the mining, processing, reprocessing and disposal of radioactive materials, the chances that the water supplies will one day contain objectionable quantities of dissolved or entrained radioactive materials increase year by year.

In view of the above, it should be apparent that the only way of assuring that the drinking water will indeed be harmless as well as devoid of most if not all contaminants is to subject the tap water to final purification directly at the point of use. Consequently, there have already been developed various arrangements and systems for accomplishing this purpose. So, for instance, it has been proposed to first filter the tap water to rid it of particulate contaminants and other pollutants which can be absorbed, adsorbed or otherwise captured by a filtration medium, such as activated carbon or charcoal, and then to heat the thus filtered water to an elevated temperature, possibly as high as its boiling point, to thereby kill all or at least inactivate most of the bacteria, germs, viruses and other biological contaminants, as well as to cause substances with low boiling points to escape into the ambient air. However, experience with this approach has shown that, at least in some instances, the results of such a process are rather disappointing, particularly since many of the contaminants remain in the water being purified after the original filtration and are not expelled therefrom by the heating, and that some materials which could be filtered out stay in the water. In the previous art, inefficient filtration is associated with the very limited dwell or residence time of the water being purified in the filter.

It has also been proposed to obtain the purified water at the point of use by resorting to a distillation process, and various arrangements employing this distillation principle, some of them rather complex and correspondingly expensive, have been proposed. However, this approach also suffers from a rather serious drawback, which resides in the fact that at least some substances with a boiling point lower that that of water will evaporate before the water does, and will precipitate during the following condensation phase of the distillation process, rather than escape into the ambient atmosphere. Thus the concentration of these substances in the distilled water is increased, particularly in view of the fact that not all of the water being purified may be available for distillation and not all of the water which is available for distillation is actually converted into water vapor or steam and caused to condense; especially when the distillation is performed with discrete batches of water, rather than on a continuous basis. Another limitation of the distillation method is the formation of difficult to remove mineral scale formed on heated surfaces in the evaporator of the distiller. Further, the distilling process is usually rather expensive since it requires a substantial amount of energy, especially for converting the water from its liquid state into its gaseous state or water vapor or steam.

Examples of arrangements of the above-discussed type, or of equipment to be used in conjunction with such arrangements, are described in U.S. Pat. applications Ser. Nos. 300,423, 442,951 and 443,599, all of which have been abandoned. So, for instance, the U.S. application Ser. No. 300,423 discloses a water distiller in which the water being purified flows toward an evaporator in quite convoluted paths to increase its dwell time in the arrangement prior to reaching the evaporator and thus to increase the chance of volatilization and escape of low boiling contaminants from the water. The application Ser. No. 442,995 describes another distillation arrangement in which the water is evaporated in an evaporator and condensed in a separate vessel which is so constructed as to also accumulate the distilled water and to keep the internal surfaces of such vessel sterile. However, in either one of these arrangements, none of the water is recirculated, and no filter is included in the flow paths of water to the evaporator, so that the degree of purification obtained by these arrangements is lower than desired. Finally, the application Ser. No. 443,599 discloses another distillation arrangement in which the water to be purified, which is continuously admitted into the arrangement to replenish the water that has been converted to steam and then condensed in an external condensation receptacle, first passes through a sedimentation device. However, even here, there is no recirculation of the partially purified water, and no passage of such water being recirculated through any filtering means.

SUMMARY OF THE INVENTION

Accordingly, it is a general object of the present invention to avoid the disadvantages of the prior art.

More particularly, it is an object of the present invention to provide a water purifying method which accomplishes a high degree of water purification.

Still another object of the present invention is to develop a method of the type here under consideration which can rid the water of most if not all kinds of contaminants at a relatively low cost.

A concomitant object of the present invention is to devise an arrangement which is capable of performing the above-mentioned objects and is relatively simple in construction, inexpensive to manufacture, easy to use and reliable in operation nevertheless.

It is yet another object of the present invention to devise a water purifying arrangement of the above type in order to rid the water being purified of contaminants which have a boiling point lower than that of water, and contaminants which can be captured in a filtering medium.

In keeping with the above objects and others which will become apparent hereafter, one feature of the present invention resides in a method of purifying water, this method comprising the steps of introducing a predetermined finite amount of impure water to be purified into a filter; filtering the water being introduced to obtain partially purified water; accumulating the partially purified water in a confined space to form a body of water therein; heating the partially purified water to a temperature to and about the boiling point thereof; reintroducing the partially purified water into the same filter; and continuously repeating the filtering, accumulating and heating steps with the partially purified water contents of the body with attendant further purification of the partially purified water, until the degree of contamination of such water has dropped below a predetermined level. A particular advantage of the method of the present invention as described so far is that, by repeatedly causing the partially purified water to be filtered, a much higher proportion of the contaminants capable of being filtered out of the water than if the water passed through the filter only once will be retained in the filter and thus removed from the purified water. Moreover, by repeatedly heating the partially purified water to and about its boiling temperature, a much higher proportion of the low boiling contaminants than otherwise will be driven off from the water and escape into the ambient atmosphere.

According to another advantageous concept of the present invention, the inventive method further comprises the steps of distilling a predetermined portion of the purified water contents of the body subsequently to the completion of the repeating step; and collecting the distilled water in a collecting space for eventual consumption. An advantage of this feature is that even a higher proportion of both the low and high boiling point contaminants than by previous methods will be removed from the water being purified.

The present invention is also directed to an arrangement of purifying water, this arrangement comprising means for defining a confined space; means for introducing a predetermined finite amount of impure water to be purified into the confined space; means for filtering the water being introduced to obtain partially purified water; means for bounding an accumulation chamber within the confined space for accumulating the partially purified water in the form of a body of water therein; means for heating the partially purified water to a temperature to and about the boiling point thereof; and means for continuously circulating the partially purified water contents of the body through the filtering means, the accumulation chamber and past the heating means with attendant further purification of the partially purified water, until the degree of contamination of such water has dropped below a predetermined level. It is further advantageous in this context when the defining and bounding means includes a vessel having an upper region receiving the filter means and a lower region constituting the accumulation chamber, and a perforated lid removably supported on the upper region. Then, the heating means may advantageously include an electric resistance heater so situated in the accumulation chamber as to be fully immersed in the body of water, and the circulating means may include a steam collecting bell disposed upwardly of the heater for collecting steam generated by the heater, and a riser tube extending from the steam collecting bell toward the filtering means for conducting the collected steam, together with water slugs entrained thereby, to the filtering means. It is advantageous in this context when the riser tube has an external support collar and when the filtering means is a cartridge having a central passage for receiving a portion of the riser tube, and supported on the support collar of the riser tube when received in the upper region of the confined space.

According to another facet of this invention, the vessel has an outlet at the lower region thereof, the heating means includes an external heater situated at the exterior of the vessel and communicating with the outlet, and the circulating means includes a riser tube situated at the exterior of the vessel and communicating with the heater, and a spout which communicates with the riser tube and is directed back into the confined space for diverting steam generated by the heater and slugs of water entrained by such steam for jointly rising in the riser tube toward the filtering means. However, it is also advantageous when the circulation means includes a riser tube extending upwardly from the heating means, and a spout communicating with an upper end of the riser tube and directed back into the confined space for diverting steam generated by the heating means and slugs of water entrained by such steam for jointly rising in the riser tube toward the filtering means. A particularly advantageous construction of the arrangement of the present invention is obtained when it comprises a holding cup received in the upper region of the vessel at least when the lid is supported on the upper region of the vessel and including a neck portion into which the introducing means and the spout are directed, and a main portion accommodating the filtering means in such a manner that water flowing from the neck portion enters the filtering means from below to flow upwardly through the filtering means and to be discharged from an upper region of the filtering means and spill over the holding cup to proceed toward the accumulation chamber.

The arrangement of the present invention may advantageously further comprise means for selectively interrupting the flow of purified water contents of the body through the circulating means subsequently to the completion of the purifying operation with attendant rise in the temperature of the water contents of the body to its boiling point and conversion of a portion of such water into steam, in which case the vessel has at least one discharge opening situated above the accumulation chamber for the discharge of the thus generated steam therethrough out of the confined space. There may then be further provided means for condensing the thus discharged steam into water and for collecting the condensed water in a collecting space for eventual consumption. Last but not least, it is also advantageous when the condensing means includes a receptacle which surrounds the vessel in an assembled condition of the arrangement.

Further features of the present invention include the employment of mechanical pumping means for delivering water from the collection vessel to the heater and filter means whereupon the heated and filtered water is again returned to the collection vessel for repeated circulation, thus providing a uniform flow rate. The apparatus further includes controls for substantially automating the purification process to simplify the operation and use of the purification system, and to afford a continuous supply of purified water.

Any of the aforementioned embodiments may be provided with a lid having a novel deflector which provides uniform distribution of the steam and water vapor slugs across the deflector whereby the water slugs and water vapor delivered to the inlet of the filter assembly is uniformly distributed across the filter inlet. A first arrangement is provided for use with systems in which the stream of slugs and water vapor are delivered to the region of the filter inlet by mechanical pumping action while a second embodiment is designed for use in a system employing thermal pumping action.

The basic purification system may further be modified to provide a substantially continuous supply of purified water through the use of an additional storage container coupled to the system through appropriate piping and control valves which in turn are operated by control means for reinitiating the purification cycle and delivering the purified water to the storage container at intervals which occur at a frequency sufficient to provide a substantially continuous flow of purified water from the storage container.

BRIEF DESCRIPTION OF THE DRAWING

The present invention will now be described in more detail with reference to the accompanying drawing in which.

DETAILED DESCRIPTION OF THE PREFERRED EMBODIMENTS

Figure 1:
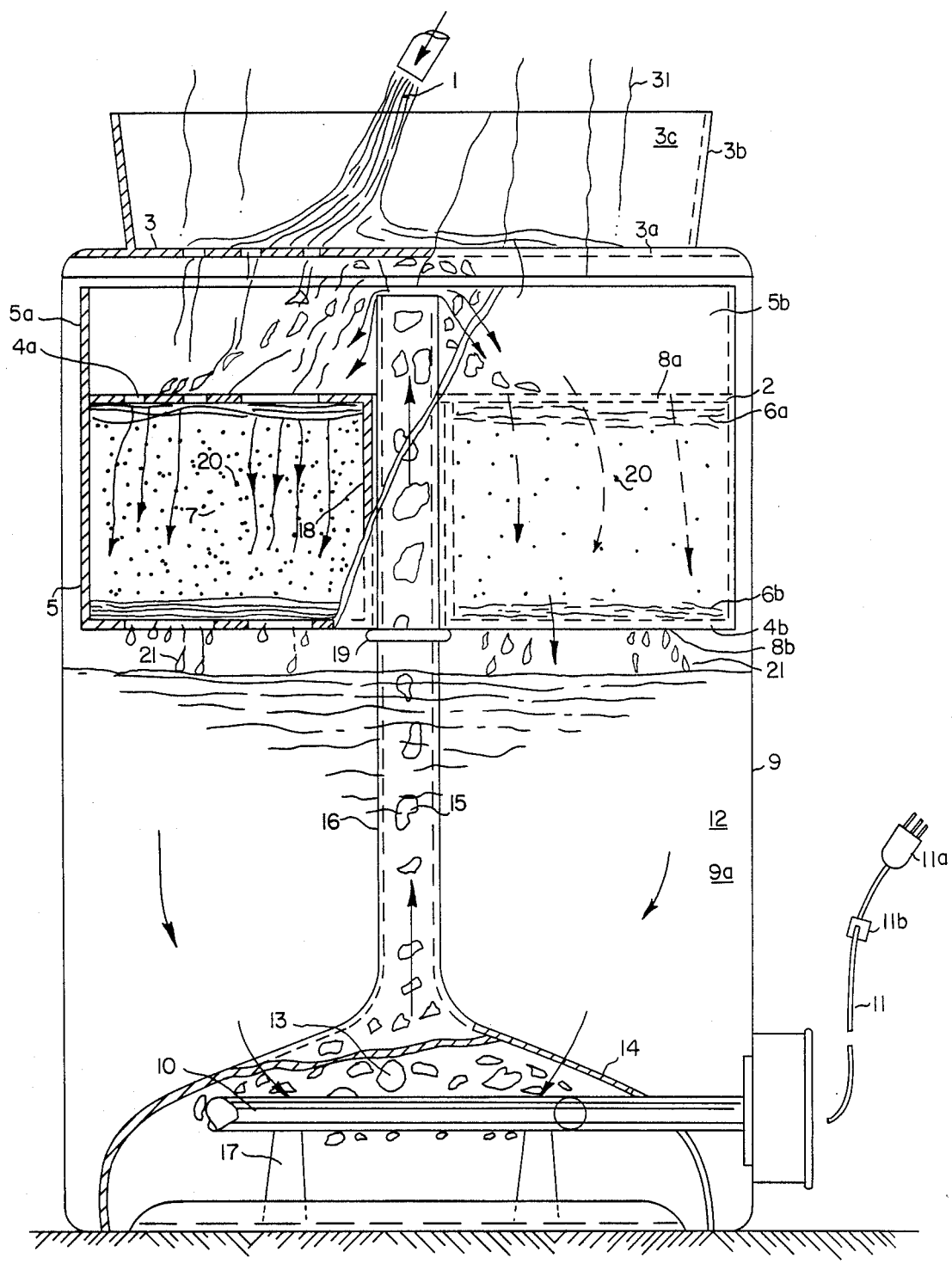
FIG. 1 is a partly sectioned side elevational view of a water purifying arrangement of the present invention.

Referring now to the drawing in detail, and first to FIG. 1 thereof, it may be seen that the reference numeral 1 had been used therein to identify a stream of water to be purified in a water purifying arrangement of the present invention. The water stream 1 is directed into a filter/purifier cartridge 2 through a perforated or open lid 3 of the water purifying arrangement. The lid 3 is shown to be perforated by perforations 3a to permit the water of the stream 1 to flow therethrough and also to permit various vapors or gaseous media to escape therethrough from the interior of the water purifying arrangement to its exterior and into the ambient atmosphere. However, if so desired, the lid 3 may be removed during an initial or filling phase of operation of the water purifying arrangement during which the water stream 1 is being introduced into the arrangement, so as to expedite the filling of the arrangement with water, in that the water stream 1 can be directly aimed at the filter/purifier cartridge 2, without being hampered by the lid 3.

The filter/purifier cartridge 2 is generally toroidal-shaped and includes an upper horizontal wall 4a and a lower horizontal wall 4b which are joined with one another by a circumferential wall 5. The circumferential wall 5 has an extension 5a which extends upwardly beyond the upper horizontal wall 4a to bound a distribution space 5b for the water to be or being purified. It will be appreciated that, regardless of whether or not the lid 3 is present during the initial phase of operation, the water from the water stream 1 reaches this distribution space 5b from where it is substantially uniformly distributed over the cross section of the filter/purifier cartridge 2 in that it accumulates to a certain extent in this distribution space 5b and thus spreads from the point or points of introduction of the water stream 1 to regions of the upper horizontal wall 4a of the filter/purifier cartridge 2 which are spaced from such point or points. Obviously, the perforated lid 3 if present during the initial or filling phase, further enhances or even by itself accomplishes the desired distribution effect with respect to the water stream 1 in that the water of the water stream 1 spreads on the lid 3, basically in the indicated manner, before it flows through the perforation 3a. To avoid spillage of the water of the stream 1 over the outer periphery of the lid 3, the lid 3 includes an upstanding collar 3b which circumferentially completely surrounds a receiving space 3c for the water of the stream 1.

The upper and lower horizontal walls 4a and 4b, together with the circumferential wall 5, further bound an internal chamber 20 which receives two sediment filters 6a and 6b which are respectively juxtaposed with the upper and lower horizontal walls 4a and 4b and which may be made of cloth, fiber sliver or other materials capable of capturing particulate material from the water flowing therethrough. Sandwiched between the two sediment filters 6a and 6b, and filling a predominant part of the volume of the internal chamber 20, is a filtering medium 7, such as activated carbon or charcoal or any other known substance capable of adsorbing or absorbing dissolved impurities from the water passing therethrough. Each of the upper and lower horizontal walls 4a and 4b is perforated with a number of openings 8a and 8b, respectively, to permit the water being purified to pass under the influence of gravity from the distribution space 5b through the openings 8a into the internal chamber 20 and from there through the openings 8b into an accumulation space 9a of a vessel or container 9 to accumulate in this accumulation space 9a. *Impure water of the water stream 1 is directed in the abovementioned manner through the filter/purifier cartridge 2 until the interior of the vessel 9 is about two-thirds full.*

An electric resistance heater 10 is situated at the bottom region of the accumulation space 9a of the vessel 9. The electric resistance heater 10 is supplied with electric current via an electric cable 11 when an electric plug 11a of the cable 11 is plugged into an electric outlet and when an electric switch 11b interposed in the electric cable 11 is switched on. The electric resistance heater 10 is completely immersed in a body 12 of water which is accommodated in the accommodation space 9a. When the electric resistance heater 10 is turned on, it heats the water contents of the body 12 which is to be purified. At this time, the lid 3 is put on the upper rim of the vessel 9, if it was not in place before, so that vapors and other gaseous media can escape from the interior of the vessel 9 only through the perforations 3a of the lid 3, thus reducing to the desired level the flow-through cross-sectional area for the escape of such gaseous media.

As the heating of the water contents of the body 12 by the electric resistance heater 10 proceeds, and in the course of several minutes, steam bubbles 13 start to form in the body 12 of water and particularly on the electric resistance heater 10, even though the temperature of the water contents of the body 12 as a whole has not yet been raised to the boiling point. As the temperatures of the electric resistance heater and of the water of the body 12 rise further, these steam bubbles 13 become disassociated from the electric resistance heater 10 and rise in the body 12 of water, to be eventually captured by and collected in a steam collecting bell 14.

The steam collecting bell 14 merges at its upper central region into an upwardly extending riser tube 16 which passes through the central region of the filter/purifier cartridge 2 and terminates at a predetermined distance above the upper horizontal wall 4a of the cartridge 2. The cartridge 2 has a tubular internal partitioning wall 18 which bounds a passage for the riser tube 16. The riser tube 16 is provided at its exterior with a supporting collar 19 on which the filter/purifier cartridge is 2 supported. Thus it may be seen that the filter/purifier cartridge is self-contained and can be easily removed from the riser tube 16 for replacement, simply by sliding it upwardly on the riser tube 16 after the lid 3 has been removed from the vessel 9. A new or replacement filter/purifier cartridge 2 can just as easily be mounted on the riser tube 16 by introducing the upper end of the riser tube 16 into the passage bounded by the partitioning wall 18 and then sliding the cartridge 2 downwardly on the riser tube 16 until it comes to rest on the supporting collar 19.

Relatively soon after the commencement of the operation of the purifying arrangement of the present invention, as the temperature of the water being purified approaches its boiling point without actually reaching it except in the immediate vicinity of the electric resistance heater 10, the steam collected in the steam collecting bell 14, together with entrained water slugs 15, will start to rise through the interior of the riser tube 16, since the specific weight of the mixture of steam and entrained water in the interior of the riser tube 16 is considerably lower than the specific weight of the considerably colder water of the body 12 being purified which is situated outside the riser tube 16 and the steam collecting bell 14. Consequently, this imbalance in the specific weights and thus downward pressures of the water columns situated, on the one hand, in the interior and, on the other hand, at the exterior, of the riser tube 16 will cause the colder water to move downwardly and through respective slots 17 into the interior of the steam collecting bell 14, while the steam collected in the steam collecting bell 14 and the aforementioned water slugs 15 entrained thereby will rise in the riser tube 16.

As the heating continues, the water slugs 15 will spill over or be ejected, together with the steam, from the upper end of the riser tube 16, possibly striking the lower major surface of the lid 3, whereafter the water slugs 15 and any water which may have precipitated on the lid 3 from the steam will fall by gravity onto the upper horizontal wall 4a of the filter/purifier cartridge 2, substantially as indicated, to be again distributed over this upper horizontal wall 4a and flow again through the openings 8a into the internal chamber 20 of the filter/purifier cartridge 2, where it is acted upon again by the sediment filters 6a and 6b and the filtering medium 7 sandwiched therebetween and flows by gravity toward and through the openings 8b in the lower horizontal wall 4b to rejoin the water contents of the water body 12. In other words, the heated water percolates through the filtering medium 7.

After leaving the internal chamber 20 of the filter/purifier cartridge 2 through the openings 8a, the purified water drips in the form of drops 21 into the body 12 of water and is mixed with the water contents of such body 12 due to the agitation caused by the heating of the water contained in the accumulation space 9a of the vessel 9. Then, the heating and filtering cycle described above will be repeated several times during the twenty or so minutes allotted to the purifying operation. In other words, the amount of water flowing through the filter/purifier cartridge 2 after the commencement of the heating of the water of the body 12 is several times larger than the amount of water of the body 12.

After about twenty minutes of being continuously heated by the electric resistance heater 10, rising through the interior of the riser tube 16, and flowing downwardly through the filter/purifier cartridge 2, the water being purified will have had ample residence or contact time with the filtering medium 7 during the many times it has been carried up and allowed to pass down back into the accumulation space 9a of the vessel 9 to substantially rid it of all dissolved impurities. At this point, the switch 11b is switched into its off position, and the electric resistance heater 10 and the now purified water of the body 12 will commence to cool off. The filter/purifier cartridge 2 is removed from the interior of the vessel 9, together with the riser tube 16 and the steam collection bell 14, and then the purified water can be dispensed from the vessel 9.

It will be appreciated that virtually all low boiling point or volatile organic and inorganic material will have been driven out of the water being purified. This is so because such volatile vapors and gases will be discharged into the ambient atmosphere through the perforations 3a in the perforated lid 3, as indicated at 31. Volatile organic compounds, which would otherwise tend to be adsorbed by the filtering medium 7, will also be driven off and discharged into the atmosphere due to the high temperatures of about 85 to 90° C., or 185 to 195° F. reached in the filter/purifier cartridge 2. Also, any bacterial or other biological growth in the filtering medium 7 will be stopped or prevented by the moist heat cycling of water and steam through the filter/purifier cartridge 2.

Figure 2:
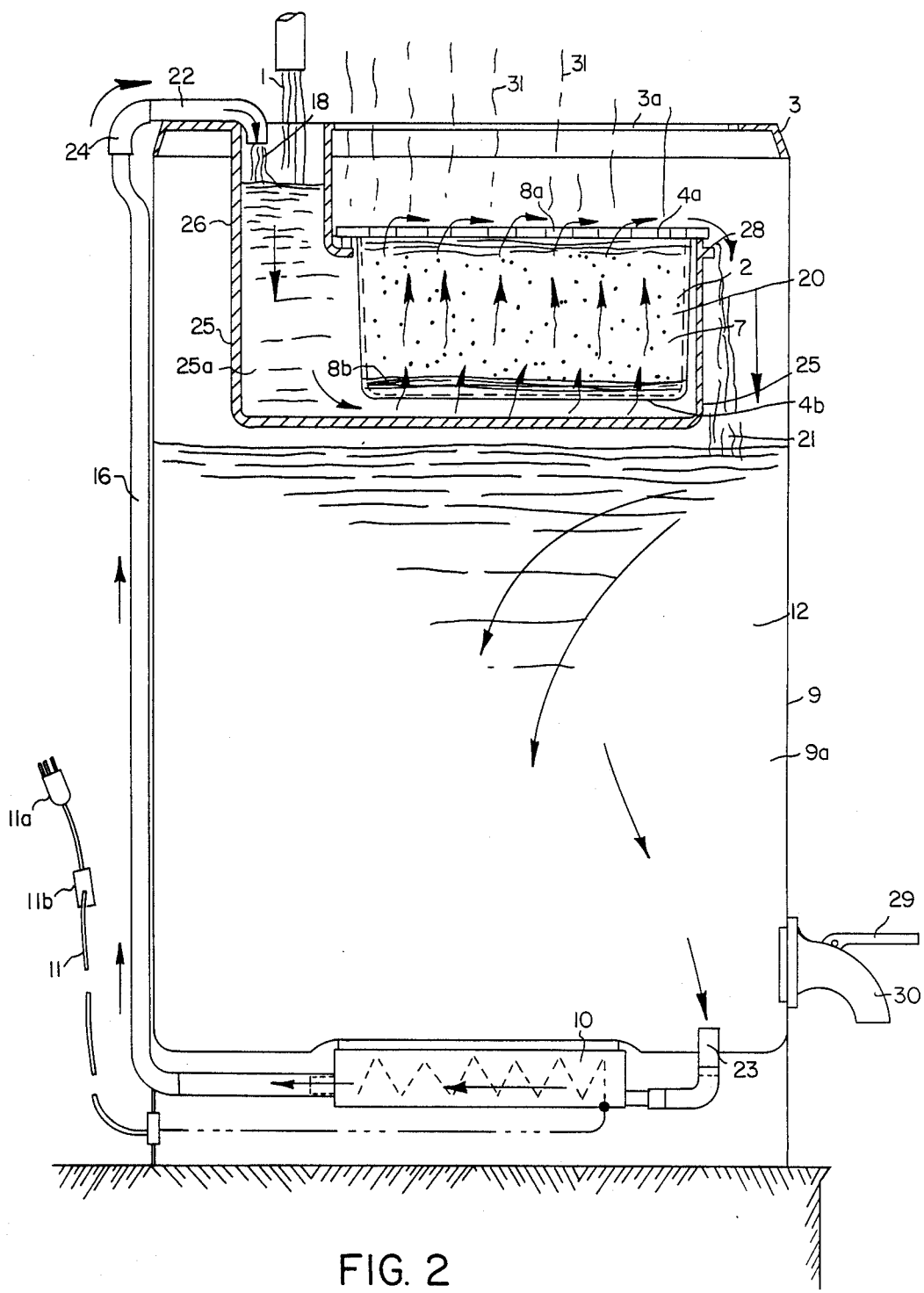
FIG. 2 is a view similar to FIG. 1 but of a modified construction of the water purifying arrangement.

Turning now to FIG. 2 of the drawing, it will be seen that it depicts a modified construction of the water purifying arrangement according to the present invention, which is similar to that described above in so many respects that the same reference numerals as before will be utilized in conjunction with FIG. 2 to identify corresponding components and only the differences between these constructions will be addressed here in detail. This modified construction of the water purifying arrangement, like that discussed above, is to be used for producing batches of purified water. The vessel 9 of this modified water purifying arrangement is constructed as an urn, and the riser tube 16 is arranged at the exterior of the vessel 9 and is connected by a connecting sleeve 24 to a spout 22 which opens into a neck portion 26 of a holder cup 25. The water stream 1 is also introduced into the neck portion 26 of the holder cup 25 during the initial or filling operation to fill a holding chamber 25a of the holding cup 25 and eventually to overflow and fill the accumulation space 9a of the vessel 9 to the desired level to constitute the body 12 of the water to be purified therein.

In this construction, the water is not heated inside the vessel 9. Rather, it flows through an outlet 23 to the heater 10 which is arranged at the exterior of the vessel 9, and from the heater 10 into the riser tube 16. The heater both heats the water and produces steam and water slugs, and heats the bottom of the vessel 9 so as to additionally heat the body 12 of water contained in the accumulation space of 9a of the vessel 9. The holder cup 25 is arranged at the upper region of the interior of the vessel 9, and it accommodates the filter/purifier cartridge 2 which is similar to if not identical with that described above. In this case, after the completion of the initial or filling operation, and after energization of the external heater 10. Steam and water slugs 15, not shown in FIG. 2, which issue from an open end of the spout 22, enter the neck portion 26 of the holder cup 25 and the water collects therein. This collected water, like the water of the stream 1 before, flows upwardly through the filter/purifier cartridge 2, that is, it enters the internal chamber 20 of the cartridge 2 through the openings 8b of the lower horizontal wall 4b of the cartridge 2 and leaves the internal chamber 20 through the opening 8a provided in the upper horizontal wall 4a of the cartridge 2, after having passed through the filtering medium 7 and through the respective sediment filters 6b and 6a, (not shown in FIG. 2). As the water level in the holder cup 25 rises, the water which has been purified and filtered rises above a rim 28 of the holder cup 25 and spills over this rim 28 to descend under the influence of gravity into the body 12 of water to mix with the water contained in the internal space 9a of the vessel 9.

The vessel 9 is equipped with its own cover 3 which is provided with perforations 3a which permit volatile vapors to leave the interior of the vessel 9 and be vented into the ambient atmosphere, as again indicated at 31. The purified water contents of the body 12 of water can be conveniently drawn from the interior of the vessel 9 after the termination of the purification operation, which again involves repeated circulation of the water through the riser tube 16 and the filter/purifier cartridge 2, through a faucet 30 which is equipped with an actuating handle 29. These differences not withstanding, the above-described constructions of the water purifying arrangement of the present invention operate in the same way as the embodiment of FIG. 1.

Figure 4:
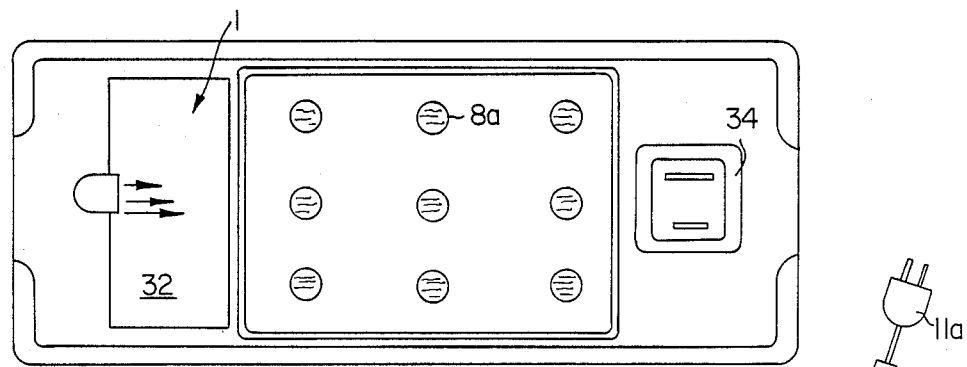
FIG. 4 is a top plan view of the arrangement of FIG. 3.
Figure 3:
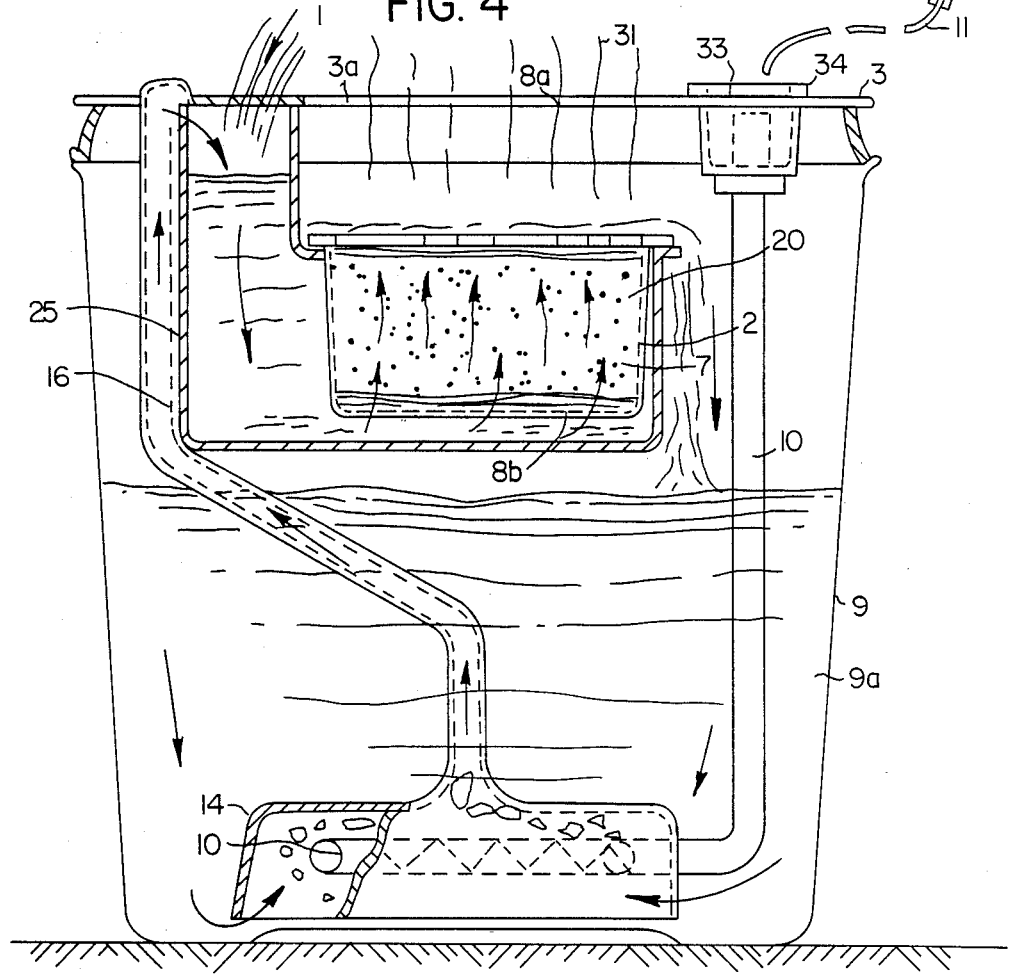
FIG. 3 is another view similar to FIG. 1 but of a further modification of the water purifying arrangement.

FIGS. 3 and 4 of the drawing reveal another modified construction of water purifying arrangement of the present invention, which is particularly well suited for use for small models of this arrangement, particularly those to be used by tourists and travelers. Here again, the same reference numerals as before have been used to identify corresponding parts. The vessel 9 of this arrangement could be made, for instance, from stainless steel and its open upper end can be closed by the lid 3 which is correspondingly shaped. An important design feature of this modified construction is that all of the essential components of the arrangement, that is, the steam collecting bell 14, the riser tube 16, the holder cup 25, the internal electric resistance heater 10, and the filter/purifier cartridge 2, are physically mounted on and are affixed to the lid 3, and/or are integral parts of the lid 3. The cartridge 2 is removable from the holder cup 25 and can therefore be easily replaced when the filtering medium 7 is expended.

In this particular construction, the stream 1 of raw water to be purified is introduced into the interior of the arrangement through a water filling aperture 32 provided in the lid 3. The action of the filter/purifier cartridge 2, and the flow of water therethrough, are the same as explained above in conjunction with FIG. 2 of the drawing. The electric power cord or cable 11 is provided, at its end remote from the plug 11a, with an additional plug 33 which can be plugged into a socket 34 that is mounted on the lid 3 and is electrically connected with the heater 10 to supply electric energy thereto during the purifying operation. On the other hand, when the water purifying arrangement is out of use, the plug 33 can be unplugged from the socket 34 and the electric cord or cable 11 can be stored in the interior of the vessel 9. Because of its rectangular shape, and if built in a small size, this particular arrangement can be easily stored in a traveler's bag or in a suitcase. In all other respects, the modified construction of FIGS. 3 and 4 is the same in terms of construction and mode of operation to the constructions described before.

All of the materials of the parts used in this water purifying arrangement that are not made of stainless steel should be non-toxic material and capable of withstanding heat without damage thereto at the temperature of boiling water. Also, when the vessel 9 is made of a high-temperature heat resistant material, such as the aforementioned stainless steel, the water purifying arrangement of the present invention can be operated, in the absence of electric power, directly over an open fire or any other source of heat.

Figure 5:
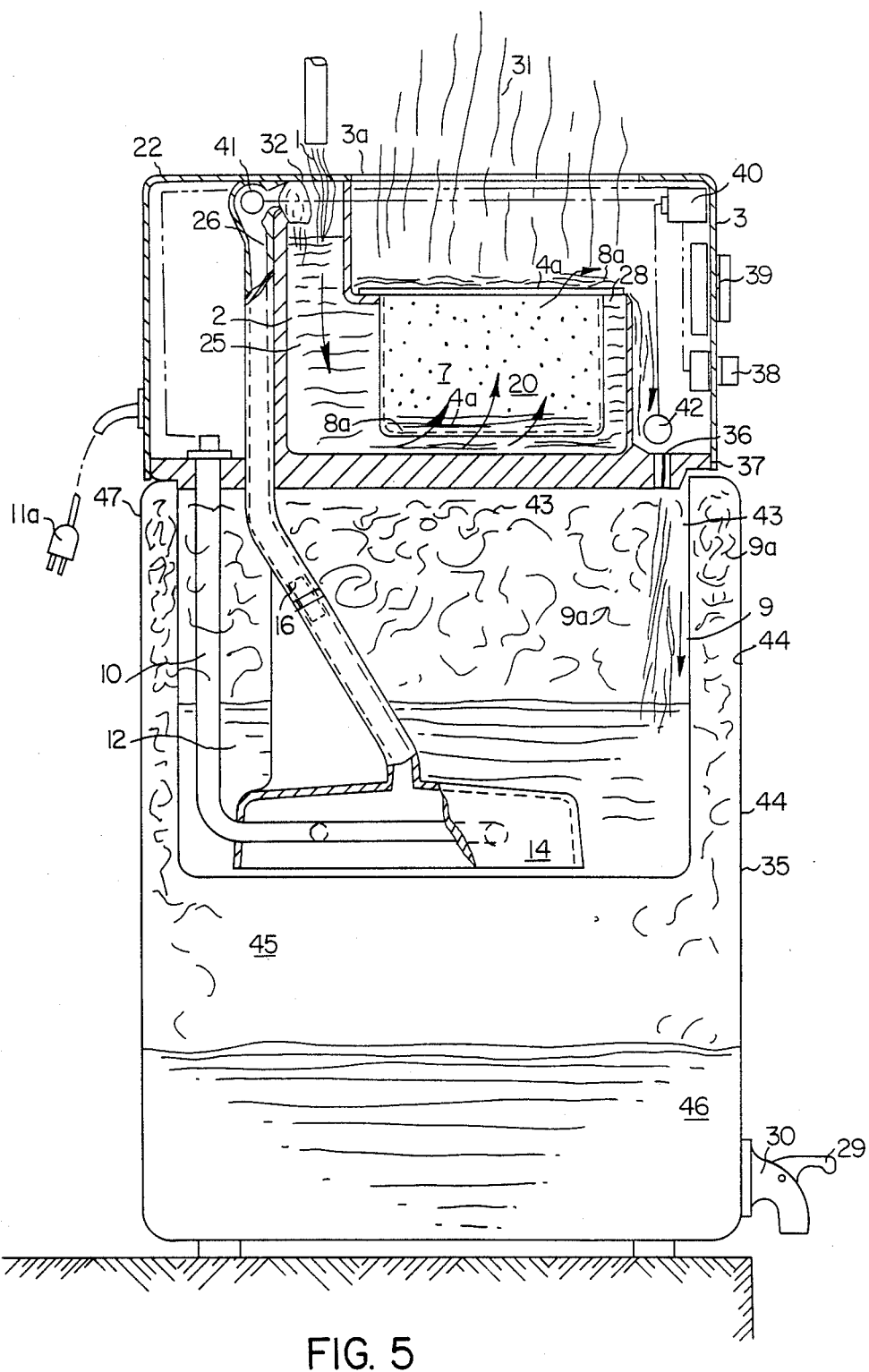
FIG. 5 is still another view similar to FIG. 1 but of a further modified and amplified construction of the water purifying arrangement of the present invention.

Finally, FIG. 5 of the drawing shows an additional modification of the water purification arrangement of the present invention, in which the water which is purified in the manner described above is subjected to a final stage of distillation, and only such distilled water is then used for consumption. Once more, parts of the arrangement which correspond to those which have already been discussed before will be identified with the same reference numerals, and only such parts which have not been described before or which have been modified with respect to those described above will be discussed in some detail.

The construction shown in FIG. 5 comprises three principal components, namely a condenser/storage receptacle 35, the vessel 9 for heating the body of water, and the lid or top section 3 which is mounted over the heating vessel 9 in the manner illustrated in FIG. 5. A predetermined amount of impure water, for instance three gallons, is fed in the form of the water stream 1 through the aperture 32 provided in the top section 3 into the interior of such top section 3 and more particularly into the neck portion 26 of the holding cup 25 which accommodates the filter/purifier cartridge 2 in the manner explained above. The water being fed into the top section or lid 3 flows in the manner indicated by respective arrows first downwardly through the neck portion 26, and then upwardly through the filter/purifier cartridge 2. After leaving the cartridge 2, the partially purified water flows downwardly toward and through an orifice 36 provided in a bottom wall 37 of the lid or top section 3, to enter the accumulation chamber 9 of the heating vessel 9 and to accumulate therein in the form of the body 12 of water.

After the predetermined amount of water, in the case presented here about three gallons, has been fed into the water purifying arrangement, the arrangement of the present invention as illustrated in FIG. 5 of the drawing, which may be called a repercolation/distillation apparatus, is connected to a source of electric power by means of the plug 11a and the electric cord or cable 11. An electric switch 38 which is mounted on the top section 3 is switched on and a timer 39 which is also mounted on the top section 3 is turned to a "3 gallon" position thereof in this case. This means that electric power is applied to the resistance heater 10 which then begins to heat the water of the body 12. Within several minutes, steam and water slugs 15 will start to rise through the riser tube 16 and will be discharged through the spout 22 into the neck portion 26 of the holder cup 25. This heated water will then follow the same path as previously followed by the impure water fed into the neck portion 26, that is, through the filter/purifier cartridge 2 and down through the control orifice 37 into the accumulation chamber 9 for rejoining the body 12 of water.

The timing cycle as determined by the timer 39 is so arranged that this "repercolation" of the water contents of the body 12 occurs a number of times during a period of about 15 to 20 minutes. During this time period, the impure water has had an ample opportunity to be treated by the activated carbon or other active substance of the filtering medium 7, and volatile vapors of various contaminants will have been discharged, as again indicated at 31, into the air above the top section 3 through the perforation or perforations 3a.

At the end of the 15 to 20 minute purification period, the timer 39 acts to operate a solenoid 40 which acts on respective valve members 41 and 42 which, in response to such action of the solenoid 40, close the spout 22 and the control orifice 37, respectively. It will be appreciated that, because of such closings, steam and water slugs 15 will no longer be able to travel up through the interior of the riser tube 16 and be discharged out of the spout 22. Accordingly, no water will spill over the rim 28 of the holder cup 25 and flow toward the control orifice 37. However, as mentioned before, the control orifice 37 is also closed to prevent any further flow of water into the vessel 9 for heating.

However, the heating action of the electric resistance heater 10 continues and, as a result of such continued heating, the water of the body 12 of water begins to boil vigorously, so that steam will be generated in substantial amounts. This steam then passes, under the pressure which builds up in the otherwise sealed off interior of the heating vessel 9, via respective vent openings 43 provided in the circumferential wall of the heating vessel 9, into an annular space 44 present between the external surface of the circumferential wall of the heating vessel 9 and the internal surface of the circumferential wall of the condenser/storage receptacle 35, where it easily condenses on the circumferential wall of the receptacle 35 since this circumferential wall is externally cooled by ambient air. The thus condensed water will then proceed downwardly into a collection chamber 45 where it will gradually build up a supply 46 of purified and distilled water.

This stage of distillation of the previously purified water which has accumulated in the heating vessel 9 is continued under the control of the timer 39 until about 2 gallons of water originally fed into the vessel 2 have been vaporized, condensed and collected in the receptacle 35. With a 1000 watt heater, this distillation phase or stage will take about 3 hours. The condenser/storage receptacle 35 has at least one atmosphere vent 47. After the completion of the distillation phase, the purified water can be discharged from the collection chamber 45 through the faucet 30.

Before the next batch of water can be purified in this purifying arrangement, a simple procedure is to be performed. First, the entire top section 3 of the water purifying arrangement is lifted up and removed, together with all electrical and other major components which are secured to this top section 3, from the vessel 9. Then, the heating vessel 9 is lifted out and the residual polluted water contained therein is discarded. The vessel 9 is then returned into the receptacle 35 and the lid or top section 3 is mounted on top of it. After this is done, the arrangement is once more ready for the performance of the filling operation with the next batch of impure water.

The action of hot steam on the condenser/storage receptacle 35 tends to keep it in a bacteriologically safe condition, and "pasteurizes" the water stored in this receptacle 35. Only very simple maintenance is required from time to time as the need arises, this maintenance involving occasional scouring of at least the internal surface of the heating vessel 9 to remove scale deposited thereon, and replacing the filter/purifier cartridge 2 every several months, depending on the use of the arrangement and the degree and character of contamination of the impure water.

The water purifying arrangement of the present invention, and particularly that depicted in FIG. 5 of the drawing, has several advantages. For one, the activated carbon filter 7 becomes highly effective, even though it is relatively small in size, since the impure water is passed therethrough a number of times. In this manner, the "residence time" of impure water in the filtering medium 7 is many more times that of the impure water in the conventional single-passthrough filter. Furthermore, because heated water is passed through the cartridge 2, and this water becomes heated to above 160° F. in the course of the approximately 20 minutes of operation of the arrangement in the recirculation mode, there is no danger that bacteria will colonize in this cartridge 2 as they do in the activated carbon filters which are used in the conventional manner. Moreover, due to the heat and the prolonged treatment, more volatile organic compounds are driven out of the activated carbon filter 7, thus leaving more room in the filter for adsorbing other, heavier organic compounds.

Owing to its construction (only three major components), the arrangement of the present invention is easy to service and keep clean. Nothing has to be unscrewed or disassembled. The vessel 9 in which the heating and evaporation occurs is a simple pot and can be cleaned out easily. This can be done, if required or desired, before each new batch of water is purified, so that there is no accumulation of contaminants. As a result of the batch operation, and the effective purification before distillation, the water being distilled and condensed is exceptionally pure and free of volatile and other organics which, if not removed before distillation, would be carried over into and concentrated in the otherwise purified distillate. Thus, it may be seen that the invention provides an integrated, space and energy efficient arrangement in which water is filtered, pre-purified, evaporated, condensed and stored in a sterilized receptacle. All other things being equal, the arrangement of the present invention will produce water of better quality than any other system or device now being marketed, at a cost which is only a small fraction of that of the known systems or devices. Furthermore, as far as the energy efficiency of the purifying arrangement of the present invention is concerned, it is comparable to that of other distiller-type purifiers.

Figure 6:
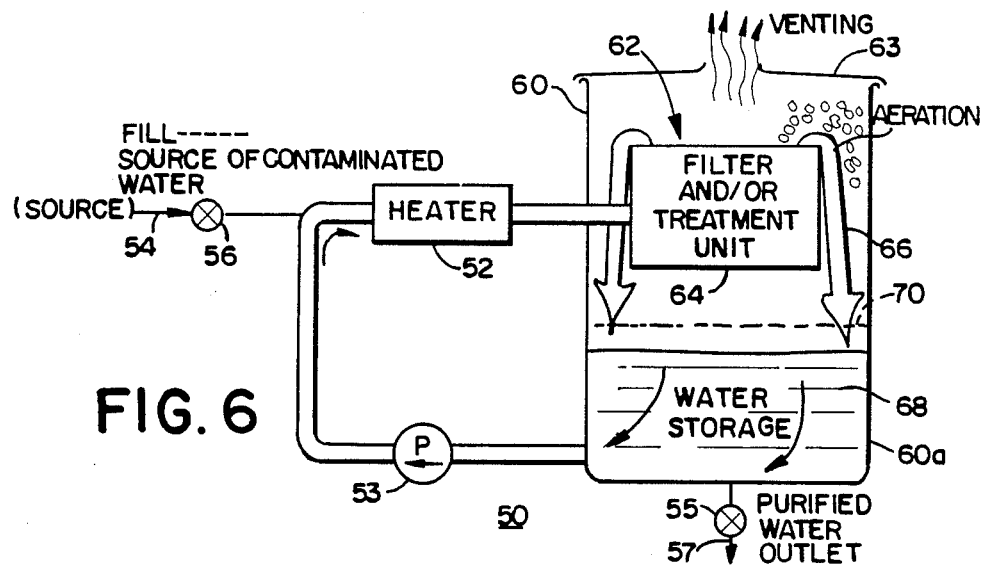
FIG. 6 is a simplified diagram showing an alternative embodiment for the purification system of the present invention.

FIG. 6 shows a simplified arrangement of still of another preferred embodiment 50 of the present invention in which contaminated water to be treated is initially caused to flow from a source 54 through a valve 56 to pass through heater 52 which is initially deenergized. The water flows through heater 52 into a filter and/or treatment unit 62 arranged within vessel 60. The water fills the container 64 housing filter 62 until it spills over and passes downwardly as shown at 66 to form a body of water 68 at the lower end 60a of vessel 60. Heater 52 is external to vessel 60 while filter assembly 62 is arranged within vessel 60 at a position above the preferred maximum water level represented by dotted line 70.

When a sufficient volume of water has been delivered to vessel 60, valve 56 is closed and the purification cycle is initiated by energization of heater 52 and pump 53. Incidently, the valve 55 in the purified water outlet 57 is normally closed prior to opening valve 56 and remains closed until a purification cycle is completed. Valves 55 and 56 are preferably solenoid controlled valves.

The purification cycle preferably takes place during a period in the range from 15 to 25 minutes, typically depending upon the degree of contamination of the water being purified.

When the heater 52 and pump 53 are energized, water is pumped out of vessel 60 and introduced into heater 52 in a repeating cycle in which the water being purified is made to flow a number of times over through every component in the purifier.

The flow rate (in gallons per minute, for example) is preferably selected so that the contaminated water makes on the order of 10 passes during a cycle time of about 10 to 20 minutes. For example, if the volume of contaminated water being treated per batch is 1.5 gallons, and the cycle takes 15 minutes, then the rate of flow established by the pump must be 1 gallon per minute in order that the water makes 10 complete passes through all of the components of the purifier during the cycle.

Stated in other words, for the above example, at a flow rate of 1 gallon per minute, in 15 minutes, 15 gallons of water is circulated through each component in the system; ten times the original batch volume of 1.5 gallons makes 15 gallons.

In order to heat properly the quantity of water set forth hereinabove and which is pumped at the aforementioned flow rate, an electrical heater having a rating of 1800 watts is adequate.

During the purification cycle the following effects are accomplished:

1. The water is heated from its lower temperature at introduction into the system through valve 56 so that by the end of the cycle all of the water remaining in the vessel (i.e., the batch of about 1.5 gallons) reaches a temperature at or about that of the boiling point of water.

2. The average residence time of the water as it passes through the filter 62 is approximately 2.5 minutes with a filter volume (capacity) of 0.25 gallons. This is calculated as follows: the volume of the filter 62 (0.25 gallons) is divided by the rate of flow of water through it (1 gallon per minute) to yield 0.25 minutes. Since the water makes 10 passes through every component in the system, then the total dwell time of the water in the filter 62 will be ten times the single pass residence time, or 10×0.25 minutes =2.5 minutes.

3. The purified water flowing out of filter assembly 62, in addition to carrying contaminated gases and vapors that are entrained in the water, further carries with it the gases and vapors that are stripped or desorbed from the surfaces of the activated carbon in the filter assembly, due to the heating of the filter system. This action is beneficial in that it prevents an excessive concentration of adsorbed materials from accumulating on the carbon thereby maintaining the carbon surfaces open and free to continue to adsorb materials of higher boiling points than the desorbed gases and vapors.

4. Water flowing out of the filter container arranged within the vented storage vessel is aerated, enabling the unwanted gases, vapors and other volatile material to escape through the vented lid 63.

5. Due to the fact that the water being purified is raised to and held at a temperature of over 80 degrees Celsius for over 15 minutes, which was determined by experiment, all vegetative forms of bacteria are destroyed.

6. During each pass in the purification cycle, the contents of the filter assembly 62 are raised to and held at a temperature sufficient to insure that bacteria, molds and fungi find it impossible to colonize in the filter medium which, in the preferred embodiment, comprises porous filter pads, activated carbon, exchange resins and other materials.

This disinfecting action occurs throughout all of the components of the system due to the time/temperature characteristics (the 5 water being maintained at above 80 degrees Celsius for one-quarter of an hour or more) so that with each cycle any potential bacteria growth is prevented.

Upon completion of a purification cycle, the water and the vessel may be drained by opening valve 55 and alternatively may be allowed to cool before use or used directly for hot beverages.

Figure 7:
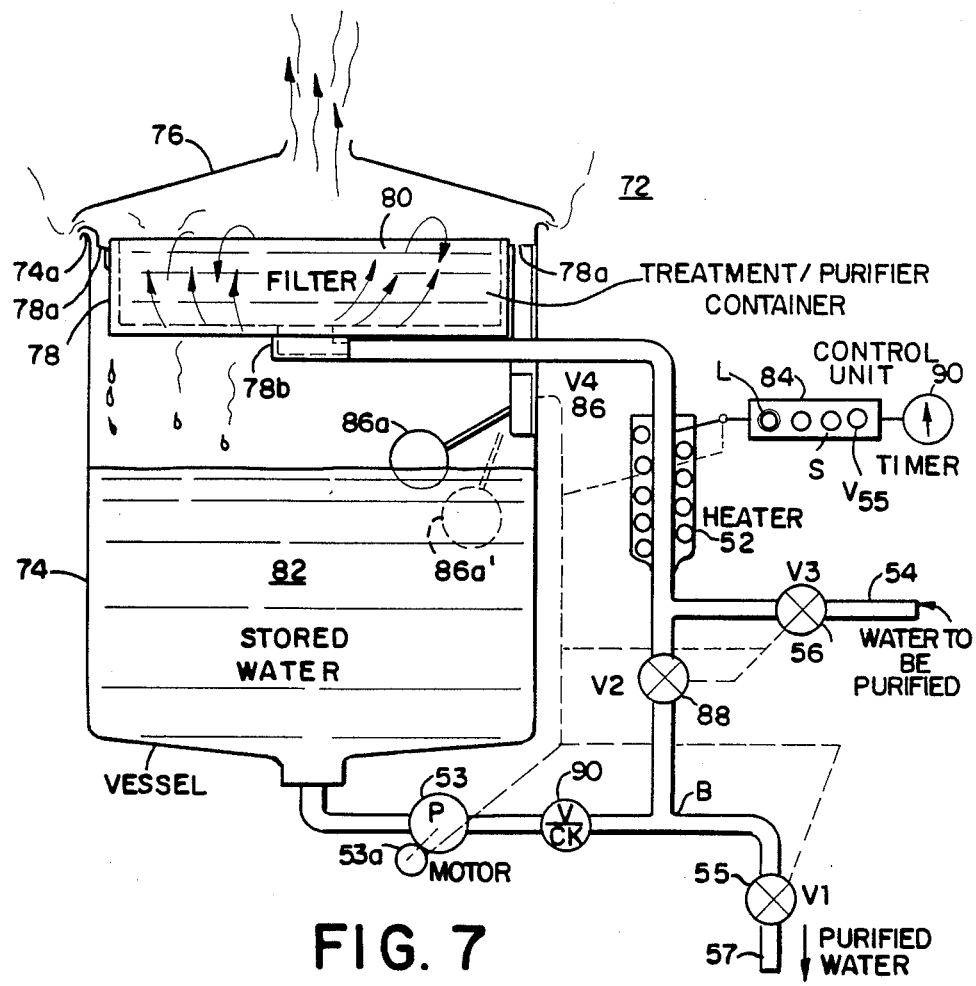
FIG. 7 shows a more detailed arrangement of the purification system shown in FIG. 6.

FIG. 7 shows a more detailed embodiment of the arrangement employed in FIG. 6 in which like elements are designated by like numerals.

The preferred embodiment 72 of FIG. 7 may, for example, be utilized in a restaurant for making coffee and other hot beverages or in a hospital ward for providing safe drinking water.

Storage vessel 74 may, for example, be a 12 gallon stainless steel container fitted with a removable, vented lid 76. Vessel 74 may be utilized to process 8 gallon batches during each purification cycle.

Filter container 78 preferably has a capacity for holding 0.75 gallons and houses a filter 80 which may comprise several layers of porous fine filters and a central packing of activated carbon. A plurality of support brackets 78a have their inner ends secured to container 78 and their curved upper ends placed over and supported by the rim 74 of vessel 74.

The operation of apparatus of 72 is as follows:

Assuming that a purification cycle has just been completed and that most of the water 82 stored in vessel 74 has been removed from the bottom of vessel 74 by pump 53, and delivered to a utilization source through valve 55, a new purification cycle is initiated by depressing the start button S provided on control unit 84.

The float 86a of the float operated switch assembly 85 occupies the dotted line position 86a' causing valve 56 to open and causing valve 88 to close. The water to be purified enters through a conduit 54 and passes through heater 52, entering at the bottom 78b of filter container 78. The water rises, filling container 78. The water then flows over the sides of container 78 and is collected in vessel 74.

As the vessel 74 begins to fill, the float rises from the dotted line position 86a' to the solid line position 86a at which point the float valve 86 closes valve 56, opens valve 88, and energizes heater 52 and pump motor 53a. Valve 55 is closed during these operations.

The pump 53 draws water from vessel 74 and delivers the water through one-way check valve 90 and valve 88 to heater 52. The flow rate in one preferred embodiment is 6 gallons per minute. At this rate, assuming a 20 minute purification cycle, 120 gallons will pass through each component of apparatus 72. Given an initial quantity of 8 gallons, this quantity will pass through pump 53, heater 52 and filter 80 fifteen times during a 20 minute purification cycle.

Assuming the liquid capacity of the filter as 0.75 gallons and a flow rate of 6 gallons per minute, the water has a dwell time in the filter of one-eighth minute, or 7.5 seconds. Given 15 passes, the total of the accumulated dwell times in the filter is 1.875 minutes or 112.5 seconds during a complete purification cycle.

A settable timer 90 begins a timing cycle upon the energization of heater 52 and pump motor 53 and, at the end of the 20 minute cycle, for example, heater 52 and pump motor 53a are deenergized and valve 88 is closed.

When it is desired to draw purified water from vessel 74, valve 55 is opened, either locally or remotely by manipulation of a valve control button $V_{55}$ forming part of control unit 84, whereupon pump motor 53a is energized to pump water out of the vessel. As an alternative, pump 53 and check valve 90 may be relocated to occupy a position between conduit branch B and valve 88, enabling valve 55 to be manually operated in order to draw water from vessels 74 by gravity, if desired.

As purified water is drawn from vessel 74, the float moves downwardly from the solid line position 86a, causing the indicator lamp L forming part of control unit 84 to be illuminated to alert the operator to initiate a new purification cycle. If desired, an auditory alarm may be either combined with or substituted for the lamp L.

Comparing the embodiment of FIGS. 6 and 7 with that shown, for example, in FIG. 1, all of the purification components in the embodiment of FIG. 1 are "internalized", although the heater element in FIG. 1 is partially isolated from the vessel by means of bell 14 which admits a portion of the water in vessel 9 to the region beneath bell 14. In addition, the embodiment of FIG. 1 employs a thermal pumping technique. The thermal pumping action (i.e. the riser tube), however, may also be external to the vessel as shown, for example, in FIG. 2.

In addition to assuring that the system provides purified water, it is extremely advantageous to optimize the heating phase interval of the purification cycle to enhance the use of the purification apparatus as well as improving the operating efficiency and economics of the apparatus, the principal factor being the energy consumed during the purification cycle.

The teachings derived from the field of microbiology, together with the inventor's experience and experimentation in the water purification field shows that all vegetative forms and bacteria contained in contaminated water will be destroyed by heating the water to 80 degrees Celsius (or above) and maintaining this temperature level for about 5 to 10 minutes. Thus, the heating phase of the purification cycle should at least meet the following criteria.

The following factors should be taken into account to yield a practical apparatus which achieves the above objectives:

1. Rate of heat input which is typically determined by the electrical resistance element used for heating.
2. Amount of water to be purified, which, along with the heater rating determines the rate of rise in temperature of the water.
3. The size and material of the portion of the apparatus forming the purifier, determines how much heat energy is required in addition to that required for heating the water in the purifier.
4. Other miscellaneous factors such as room temperature which have a relatively minor influence upon the heating rate.

Since each of the above variables may have a wide range of values, it is possible to provide a large variety of different arrangements. Rather than create a large number of arrangements each adapted to accomodate the weighting of the individual factors, a general criteria has been developed to permit components to be chosen for the purifier which provide optimal purification of the contaminated water for any given arrangement of apparatus. These criteria are as follows:

1. The average temperature of the batch of water in the purifier should be raised up to or about its boiling point and in no case to a temperature less than 80 degrees Celsius which temperature should then be maintained.
2. The time in which the first phase of heating should be accomplished should be no less than about 3 minutes.
3. Having raised the water to the appropriate temperature, the heating phase thereafter consists of providing sufficient heat to maintain the average water temperature in the purifier at 80 degrees Celsius or above that level and at or near boiling point. The second phase of the heating cycle should be no less than about 3 minutes duration.

Thus, for a practical purifier apparatus, the total heating time according to above criteria should preferably be no less than about 6 minutes.

Although the two above-mentioned heating phases can be increased in duration say, for example, to 60 minutes or more per phase, an overly long heating cycle produces a number of undesirable effects upon the water being purified.

For example, a long heating cycle causes a large volume of water to be evaporated, leaving less purified water at the end of the cycle. Also, the concentration of soluble salts which have not been trapped or otherwise removed by the filter will increase in the remaining water. In the case of excess sodium or fluoride, this is undesirable. If the heating cycle is continued indefinitely, all of the water will have evaporated leaving only the salts, minerals and solids initially contained in the water being purified.

On the other hand, if the total heating time is too short, the "residence" and exposure of the water being purified to the reagents provided in the filter may be too short reducing the ability of the filter to satisfactorily remove toxic chemicals. In addition, the aeration and desorption times are likewise reduced.

It can thus be seen that satisfying the above criteria requires a "trade off" between bactericidal effect, efficiency of removal of toxic materials and energy requirement.

A practical apparatus capable of purifying about 3 liters of water in a cycle time of 15 to 25 minutes may advantageously employ a 4 liter vessel utilizing a 1000 watt electric heater.

By raising the temperature of all components of the system, as well as the water, to a level of 80 degrees Celsius or above, for the requisite time period, the vegetative forms of all bacteria, yeast and fungi is destroyed, thus providing the capability of converting "raw water" which is untreated and generally biologically contaminated, to purified water which is safe for human consumption.

Due to the long residence time in the activated carbon filter and the repeated freeing (i.e. desorption) of adsorbed material of low boiling point from the heated carbon and the subsequent aeration and venting out of the vessel, the activated carbon is rendered particularly effective in removing toxic organic compounds such as trihalomethanes, pesticides and PCB's.

Other current purification methods such as distillation and reverse osmosis, actually concentrate the above materials in the distillate or leachate thus increasing, rather than reducing, the concentration of the toxic materials in the treated water.

The method and apparatus of the present invention make it possible to purify water having several times the permissible maximal contamination levels to a point where the presence of the contaminants are undetectable, even when using the best instrument technology currently available.

The method and apparatus of the present invention reduces concentration of prevalent toxic heavy metals and other undesirable inorganic compounds by a total average of about 90 percent.

Nonpermanent hardness is removed and, in general, the pH of the purified water is returned to or kept within the range of 6.5 to 8.5, in most cases.

The esthetic qualities of the water are improved sufficiently due to the removal of the smell and taste of chlorine and other undesirable gases and materials which are removed during the purification cycle. Suspended matter is removed in the mechanical filter and the porous activated carbon bed, greatly improving water clarity. However, not all of the dissolved minerals are removed entirely and some of the usual calcium and magnesium salts typically found in water remain in the purified water to impart a desirable taste.

Figure 8A:
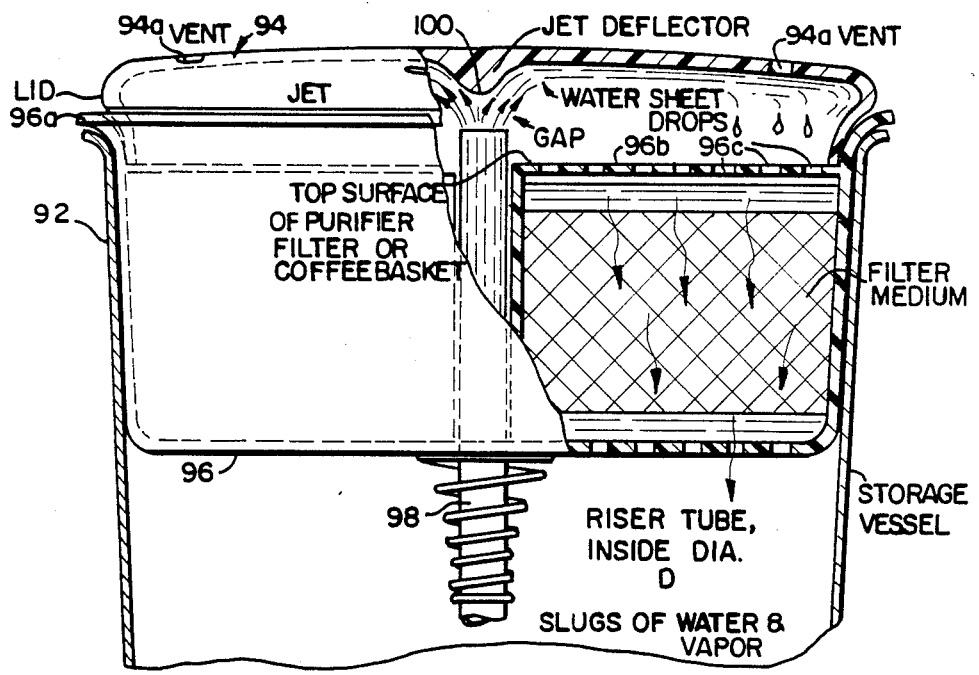
FIGS. 8a and 8b are sectional and top plan views of a deflection apparatus for uniformly distributing slugs and water vapor across the inlet of the filter assembly.
Figure 8B:
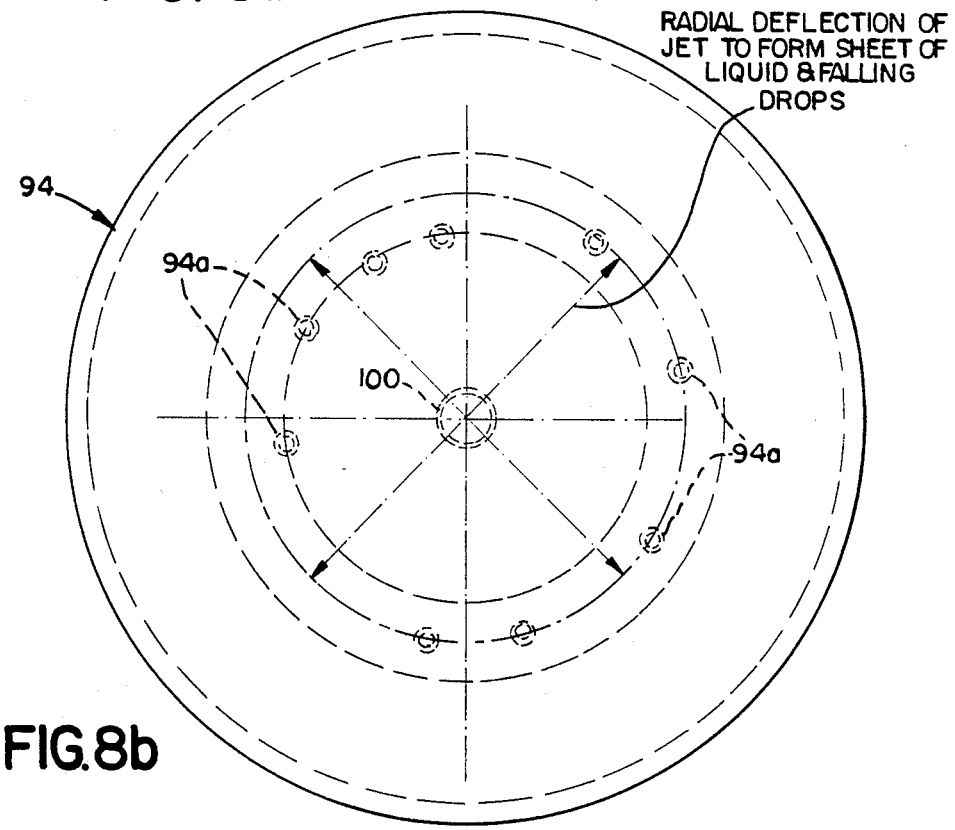

FIGS. 8a and 8b show another preferred embodiment of the present invention for improving system operating efficiency by producing a more uniform displacement of the water delivered to the top of the filter in the embodiment shown, for example, in FIG. 1. Considering the embodiment of FIG. 1, it is desirable to have the water flowing upwardly through riser tube 16—in form of a slug of water and some steam vapor—to be deflected outwardly, so as caused to condense and form drops that fall downwardly upon the filter and are preferably evenly distributed over the top surface of the purifier/filter whereupon the water then percolates downwardly through the filter medium due to the force of gravity.

If the deflection of the upwardly moving jet of steam and water slugs, the formation of water drops, and the dispersion of the drops is not uniform, then the flow of water through the filter medium will also be nonuniform. As a result, there may be selective flow channels created in the filter medium causing some sections thereof to have more water flowing therethrough than others resulting in ineffcent use of the filter medium.

This effect is particularly marked when there is only a small rate of flow of water and/or when the water pressure hydrostatic head is low and where there is no build-up of water above the top surface of the filter means as is generally the case in the examples set forth hereinabove.

Considering the embodiment of FIGS. 3a and 3b, the lid 94, which rests upon the inner surface of the lip 96a of filter container 96, is provided with a design to be more fully described which provides the following desirable effects:

1. Change in flow direction of the upwardly moving slugs of water and water vapor and the formation of a sheet of water moving radially outwards;
2. Condensation and formation of drops of water;
3. Aeration of the water vapor; and
4. Venting of steam and unwanted volatiles and toxic gases and vapors entrained in the water being purified.

As shown in FIG. 8a, the slugs of water and vapor move upwardly through riser tube 98 and are emitted in the form of a jet through the top end of riser tube 98, being driven by the steam pressure generated in the lower region of vessel 92. Alternatively, the jet of vapor and water slugs may result from a mechanical pumping action operating either alone or in cooperation with the thermal pumping action. In either case, the operation of the lid arrangement as shown in FIG. 8a is equally effective for use in the above systems regardless of the manner in which the jet stream is formed.

The jet of water vapor and slugs strikes a jet deflector 100 provided along the interior surface of lid 94. The center portion of jet deflector 100 comprises a curved projection which is aligned with the longitudinal axis of riser 98 and the jet deflector has a smooth, streamlined-shape which forms a smooth gradual curve with the surface of the lid near the perimeter thereof causing the direction of flow of the jet stream to be changed by an angle of approximately 90 degrees and apportioning and distributing the slug of water equally over the interior 360 degree surface around the axis the riser tube and along the undersurface of lid 94.

The combined dispersion and thinning out of the jet into a sheet or film of water, its change in flow direction and the formation of drops (described in more detail hereinbelow), exposes a large area of the water in the jet stream to the air under the lid, maximizing aeration of the water slugs and water vapor. A plurality of vents 94a are arranged about lid 94 to prevent pressure build-up and to permit the escape of volatile gases and vapors whether separated from or entrained within the water vapor and water slugs.

In addition to the alignment of the jet deflector 100 and the open end of riser tube 98, the gap spacing therebetween is preferably of the order of 2 to 3 times the inner diameter of riser tube 98. For example, for a riser tube having an inner diameter of 0.27 inches the gap employed is 0.75 inches or 2.78 times the inner diameter of riser tube 98.

A description of the manner in which water drops are formed will now be set forth. FIG. 8b shows a view looking down through the lid 94 which, for example, may be constructed of a transparent material such as glass, polycarbonate or other clear plastic material capable of withstanding the temperatures encountered without being deformed or destroyed. The upward moving jet is dispersed due to the jet deflector to form a sheet of water flowing radially outwardly and initially moving at a relatively rapid rate. This sheet forms a film which adheres to the undersurface of lid 94. The velocity of the liquid flow is slowed by friction between the film of water and the undersurface of lid 94 and further due to an increase in the sectional flow area as the water flows radially outwardly until a point is reached where, through molecular cohesion, water droplets form and grow to a critical size and weight, whereupon the drops so formed drop downwardly from the lid under surface and fall upon the top surface 96b of the filter holder 96. The drops of water enter into the container 96 through openings 96c.

The velocity of the water jet emitted from riser tube 98 changes during a typical purification cycle from low velocity at the beginning of the heating cycle (and consequent lower temperature and lower pressure) to a high velocity at the end of the heating cycle (wherein the high temperature and pressure levels significantly increase the velocity of the jet stream).

At the beginning of the heating cycle, drops of water tend to form at locations close to the central axis of the riser tube and jet deflector 100. As the velocity of the water slugs increases, the sheet of water that forms along the underside of lid 94 extends increasingly farther away from the center of lid 94, causing the drops to form and drop downwardly from the undersurface of lid 94 at locations closer to the outer circumference of the lid. Ultimately, slugs of vapor and steam issuing at high temperature and pressure cause the water to reach the outside rim and lip of lid 94 and thereby move downwardly along the lip of lid 94 and onto the top surface of the filter container 96. Thus, during one purification cycle the water that falls downwardly on the top surface of the filter is controlled by the jet deflector in such a manner as produce uniform contact with the filter medium over the duration of the purification cycle.

Figure 9A:
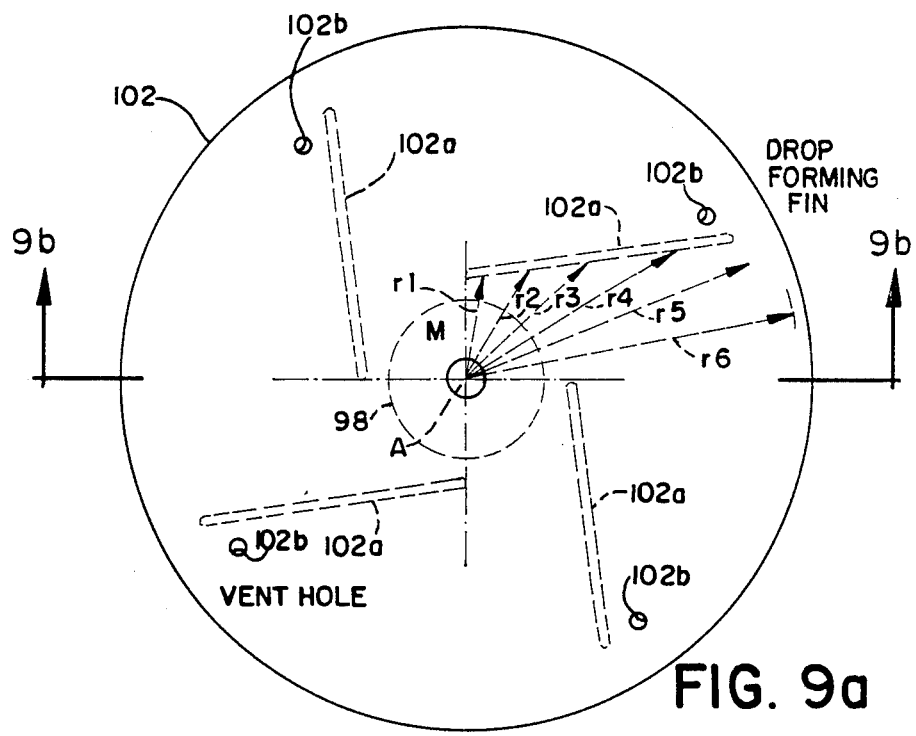
FIGS. 9a and 9b show top plan and sectional views respectively of an alternative embodiment for the deflection apparatus of FIGS. 8a and 8b.
Figure 9B:
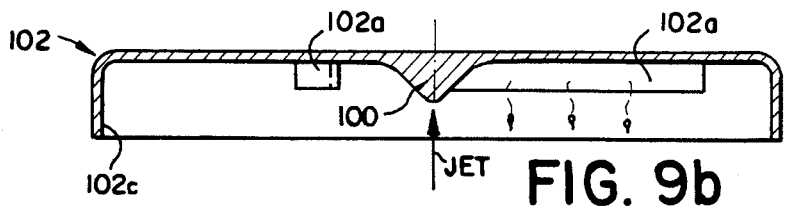

For applications in which the fluid delivery to the filter is obtained by means of a mechanical pump and wherein fluid circulation does not depend upon thermal techniques to raise the temperature and pressure of the fluid for pumping purposes, the lid of the water purification apparatus is designed in the manner shown in FIGS. 9a and 9b which shows a lid 102 provided with a plurality of fins 102a which aid in the formation and uniform dispersion of water drops.

A sheet of water formed by the jet deflector 100 moves radially outwardly simultaneously in all directions. Considering one quadrant of the operation, the water moves along radii r1, r2, r3, and so forth. Along each radius a drop is formed at a correspondingly increasingly greater distance from the center of riser tube 98 and is caused to drop downwardly upon the top surface of the filter (not shown for purposes of simplicity) due to the presence of uniformly distributed drop forming fins arranged therealong.

It should be noted that various other parameters, particularly including the velocity of the slug at the outlet of riser tube 98, are sufficient to drive water moving along radius r6, for example, to the lip 102c of lid 102 in order to form a drop.

If the velocity of the water slugs and water vapor leaving riser tube 98 is too large, drops will form at the outer rim of the lid while if the velocity is too small, the drops formed farthest from the center of the jet deflector will be very close to the center of the longitudinal axis A of riser tube 98 and jet deflector 100. As was the case with the embodiment shown in FIG. 8a, lid 102 is likewise provided with a plurality of vent openings 102b for the release of unwanted gases and other toxic material.

Figure 10:
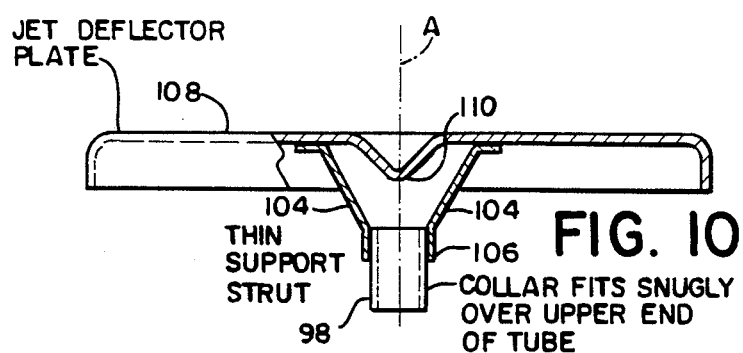
FIG. 10 is an elevational view, partially sectionalized, showing still another embodiment of the deflection apparatus.

A modification of the jet deflection apparatus is shown in FIG. 10 and is comprised of a jet deflector plate which is independent of the lid of the apparatus and is provided with an inverted tripod-like support comprised of equiangularly spaced support struts 104 having their lower ends joined to form a collar 106 which telescopingly and force-fittingly receives the top end of riser tuber 98 to form a snug fit therebetween.

The upper ends of struts 104 are secured to the underside of jet deflector plate 108 having an undersurface with a surface contour similar to that shown in FIG. 9a and 9b to define a jet deflector 110 coaxially aligned with the longitudinal axis A of riser tube 98 and further being provided with suitable vents (not shown) for release of gaseous and vaporized matter. If desired, the jet deflector plate 108 may be provided with drop forming fins of the type shown in FIGS. 9a and 9b.

One additional capability of the design shown in FIG. 10 is that the plate 108 can be retrofitted to existing water purifiers or the like without the need for extensive changes.

The essential aspect of the jet deflector design is to provide deflector means for smoothly and yet rapidly changing the flow direction of the jet stream and to distribute the radially outward flow in such a manner as to cause the drops so formed to be uniformly distributed upon the filter medium.

Although the jet deflector arrangements shown in FIGS. 8 through 10 are extremely advantageous for use in water purification systems of the type described in FIGS. 1 through 7, it should be understood that the above jet deflector techniques may be employed with equal success in percolator type devices; for example, coffee percolators wherein the water droplets are caused to drip into a basket containing ground coffee for the purpose of extracting the flavors and aromas of the coffee.

Figure 11:
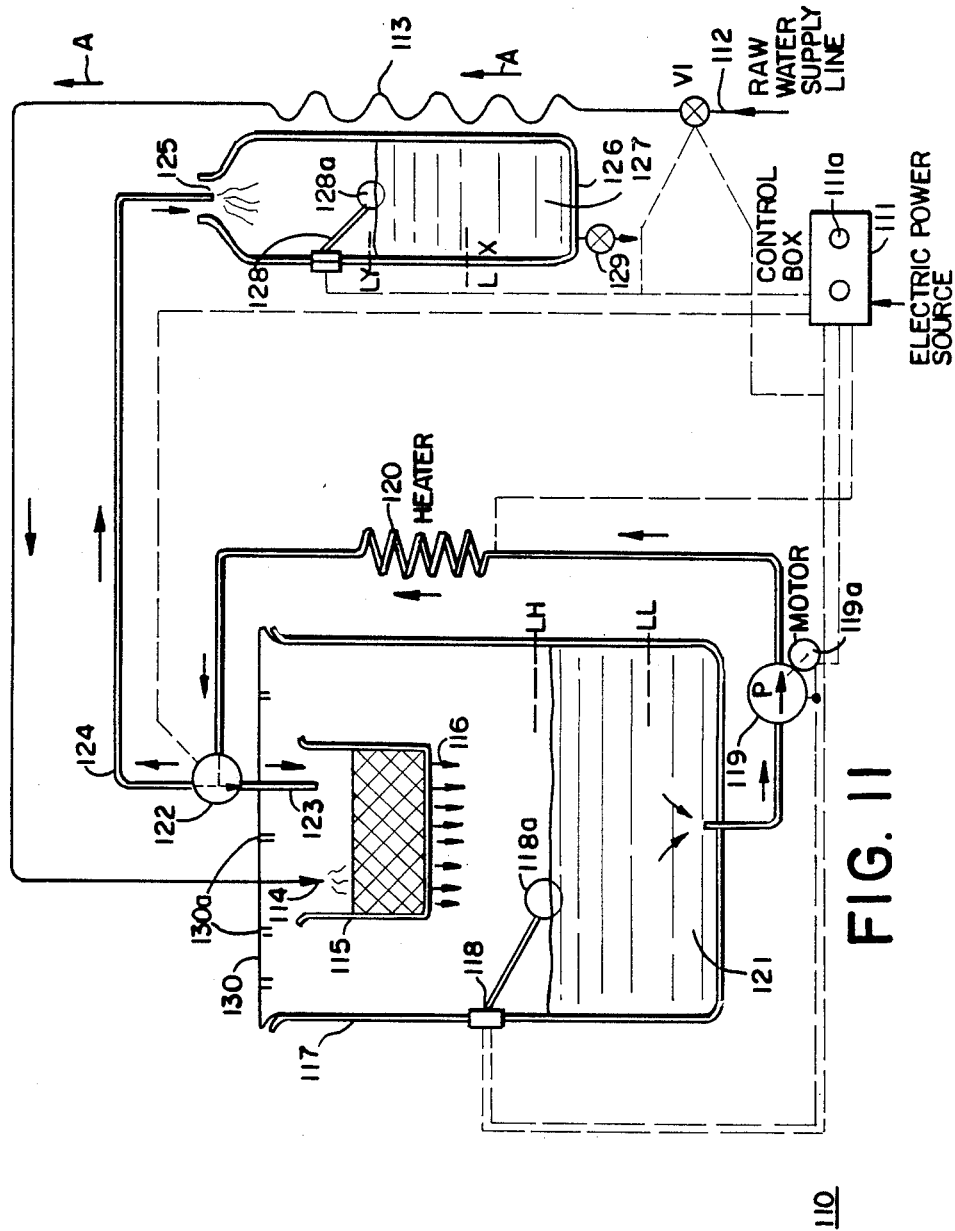
FIG. 11 shows a simplified diagrammatic view of a purification system of the type shown in FIG. 6 and 7 and including a purified water storage container and control electronics for providing purified water on a substantially continuous basis.

FIG. 11 shows another an alternative embodiment of the present invention and which is capable of producing a substantially continuous supply of purified water from a source of raw or otherwise contaminated water.

The technique and apparatus to be described herein is not limited to the production of small batches and is capable of providing purified water in a substantially continuous matter.

Considering the system 110 shown in FIG. 11 the operation is as follows:

Upon initial start-up of the system, and assuming there is no water in any of the components or tanks of the system, start button 111a of control box 111 is pressed to energize valve V1 permitting the flow of raw water from a suitable source to enter into conduit 112 and to flow in the direction of the arrows A as shown throughout the system. The water passes through heat exchanger 113 and exits through outlet 114 where the raw water flows downwardly due to the pull of gravity and into and through filter 115. After passing through the filter 115, the filter water leaves the filter through outlets 116 and is collected to form a body of water 121 at the bottom of main vessel 117. Vessel 117 is fitted with a vented lid 130 which may be designed to incorporate the features of any of the lids described herein.

As the water continues to enter main vessel 117, the level of the collected water rises above the low level marker LL and continues to rise until it reaches the high level marker LH.

Float 118a continues to rise until it reaches a point at or about level LH causing float switch 118 to operate. The electrical signal developed by the switch closure is coupled through control box 111, to simultaneously deenergize valve V1, to actuate the pump motor 119a of pump 119, and to energize heater 120.

The purification cycle is now initiated causing the water collected in vessel 117 to be drawn through pump 119 and heater 120 and then through the three port solenoid actuated valve 122 and thereafter passes downwardly to leave pipe 123 to be delivered to the top of filter 115. The water flows downwardly by gravity through filter 115 and is again returned to the vessel 117. The water repeatedly passes through the pumping, heating and filtering stations during which time the average temperature of the water in vessel 117 continually increases and approaches the boiling point of the liquid (water).

The rate of flow through the elements 115, 117, 119 and 120 is substantially uniform and is dependent upon the pump 119 and the internal dimensions of the conduit leading between the bottom of vessel 117 and pipe 123. In accordance with the preferred operating conditions described hereinabove, the volume of water, when filled to level LH, preferably undergoes 10 passes through the heater, pump, filter and vessel components over a span of 15 minutes.

The heating rate or energy input into heater 120 is such that, within the same 15 minute period, the average temperature of the water throughout the aforesaid system components increases from ambient temperature to just about 212 degrees F (at sea level).

Upon the end of a 15 minute purification cycle, when the average water temperature is about 212 degrees F, heater 120 is deenergized by a timer forming part of control unit 111. At the same time, the timer causes the three-port electrical solenoid valve 122 to divert the flow of water leaving heater 120 away from pipe 123 and into pipe 124 where it is emitted from the opposite end 125 to enter into the purified water storage tank 126.

The purified water is pumped into storage container 126 by pump 119 until the purified water reaches level LY of storage tank 126 whereupon float 128a, which is lifted by the rising water 127, operates switch 128 which operates, through control box 111, to shut off pump 119 and return 3 port valve 122 to its original position for diverting water passing through heater 120 so that the water passes only through pipe 123 and into filter 115.

At this time, the system is in a quiescent state.

Purified water may be drawn from the system by opening valve 129. As the water is removed from the container, the water level drops. Float 128a follows the water level causing the float switch 128 to operate when the water level drops to the lower limit LX causing a signal to be transmitted to control box 111 to begin a new purification cycle, whereupon valve V1 is reopened in order to deliver raw water to vessel 117 through pipe 114 and filter 115.

When the water level in vessel 117 reaches the aforementioned upper level, switch 118, operated by float 118a, signals control box 111, causing pump motor 119a and heater 120 to be energized. Just prior thereto, valve V1 is closed and the raw water delivered to the system is repeatedly circulated therethrough a number of times sufficient to both heat treat and filter the water to remove and/or destroy the undesirable contaminants through the filtering and heating actions performed upon the water as it circulates through the purification system.

At the end of the second purification cycle, three port solenoid-operated valve 122 is operated to divert all of the water passing through heater 120 to be delivered to storage container 126.

The system continues to operate in the above manner in order to maintain the level of water in the purified water storage tank somewhere between the upper and lower levels LY and LX, respectively.

In order to provide smooth continuous operation of the system, it is preferred that the volume of water between the upper and lower limits of vessel 117 be at least 50 percent greater than the volume of purified water in storage tank 126 between its upper and lower limits.

The volume of water between the lower level LX of the purified water storage tank 126 and the bottom of the storage tank should be such that the maximal expected rate of purified water drawn out of the tank should last a period of time longer than the purification cycle of the purification apparatus. For example, assuming that a purification cycle is 15 minutes, the water in the bottom part of storage container 126 should be able to last for about 20 minutes.

The heating rates and pumping rates should preferably be chosen using the criteria described hereinabove and specifically mentioned in connection with FIG. 7.

The system of FIG. 11 may further be provided with a heat exchanger comprised of coils 113 which act to increase thermal efficiency of the system by transferring the heat stored in the purified water to the raw water to thereby preheat the raw water preparatory to its introduction to the purification system, the heat exchanger coils 113 preferably encircling storage container 126. In the event that the principal use of the apparatus is to provide hot purified water, then heat exchanger 113 may be omitted.

While the present invention has been described and illustrated herein as embodied in some specific constructions of water purifying arrangements, it is not limited to the details of these particular constructions, since various modifications and structural changes are possible and contemplated by the present invention. Thus, the scope of the present invention is to be determined exclusively by the appended claims.

What is claimed is:

1. An arrangement for purifying water, comprising receiving means for receiving water;
    said receiving means including means for introducing water to be purified into said receiving means;
    said receiving means further including holding means for accumulating and holding a body of water therein;
    filtering means provided in said receiving means for filtering the water introduced into said receiving means prior to being introduced into said holding means to obtain partially-purified water;
    said filtering means being comprised of means for adsorbing and absorbing undesirable matter from the heated water passing through said filtering means;
    means for heating at least some of the water in said holding means to a temperature to and about the boiling point thereof;
    means in said receiving means for returning the partially purified heated water to said filtering means, which, in turn, filters and returns the water passing through said filtering means to said holding means to begin a new heating and filtering cycle with attendant further purification of the partially purified water, said heating means being maintained activated until the degree of contamination of such water is dropped below a predetermined level;
    said receiving means including venting means for enabling volatile matter in the water passing out of the returning means to freely pass through said venting means and into the atmosphere.

2. The arrangement as defined in claim 1, wherein said receiving and holding means includes a vessel having an upper region receiving said filtering means and a lower region for holding the body of water, and a perforated lid removably supported on said upper region.

3. The arrangement as defined in claim 2, wherein said heating means includes an electric resistance heater so situated in said holding means as to be fully immersed in said body of water; a steam collecting bell disposed above said heater for collecting steam generated by said heater, and said returning means comprising a riser tube extending from said steam collecting bell toward said filtering means for conducting the collected steam, together with water slugs entrained thereby, to the filtering means.

4. The arrangement as defined in claim 3, wherein said riser tube has an external support collar; and wherein said filtering means is a cartridge having a central opening for receiving a portion of said riser tube, and being supported on said support collar of said riser tube when placed in said upper region of said vessel.

5. The arrangement as defined in claim 2, wherein said returning means includes a riser tube extending upwardly from said heating means and having an outlet end for directing steam generated by said heating means and slugs of water entrained by such steam moving through said riser tube generally toward said filtering means.

6. The arrangement of claim 1 wherein said filtering means comprises activated carbon.

7. The arrangement of claim 6 wherein said activated carbon is granulated.

8. An arrangement for purifying water, comprising:
    receiving means having a confined space for receiving a liquid;
    said receiving means including means for introducing a predetermined finite amount of impure water to be purified into said receiving means;
    said receiving means further including holding means for accumulating and holding the partially purified water in the form of a body of water therein;
    means for filtering the water prior to being introduced into said holding means to obtain partially purified water;
    means for heating at least some of the partially purified water to a temperature to and about the boiling point thereof;
    means for returning the partially purified heated water to said filtering means, which, in turn, filters and returns the water passing through said filter means to said holding means to begin a new heating and filtration cycle with attendant further purification of the partially purified water, said heating means being maintained activated until the degree of contamination of such water has dropped below a predetermined level;

said receiving and holding means including a vessel having an upper region receiving said filtering means and a lower region for holding the body of water, and a perforated lid removably supported on said upper region;

said vessel having an outlet at said lower region thereof; wherein said heating means includes an external heater situated at the exterior of said vessel and communicating with said vessel outlet; and wherein said returning means includes a riser tube communicating with said heater and having an outlet end for directing steam generated by said heater and slugs of water entrained by such steam and jointly rising in said riser tube generally toward said filtering means.

9. An arrangement for purifying water, comprising:

receiving means having a confined space for receiving a liquid;

said receiving means including means for introducing a predetermined finite amount of impure water to be purified into said receiving means;

said receiving means further including holding means for accumulating and holding the partially purified water in the form of a body of water therein;

means for filtering the water prior to being introduced into said holding means to obtain partially purified water;

means for heating at least some of the partially purified water to a temperature to and about the boiling point thereof;

means for returning the partially purified heated water to said filtering means, which, in turn, filters and returns the water passing through said filter means to said holding means to begin a new heating and filtration cycle with attendant further purification of the partially purified water, said heating means being maintained activated until the degree of contamination of such water has dropped below a predetermined level;

said receiving and holding means including a vessel having an upper region receiving said filtering means and a lower region for holding the body of water, and a perforated lid removably supported on said upper region;

said circulating means including a riser tube extending upwardly from said heating means and having an outlet end for directing steam generated by said heating means and slugs of water entrained by such steam moving through said riser tube generally toward said filtering means;

a holding cup received in said upper region of said vessel and including a portion into which said introducing means and the outlet end of said riser tube are directed, and a main portion accommodating said filtering means in such a manner that water flowing from the outlet end of said riser tube enters said filtering means from below to flow upwardly through said filtering means and is discharged from an upper region of said filtering means, to spill over a rim of the holding cup and proceed toward said holding means.

10. An arrangement for purifying water, comprising:

receiving means having a confined space for receiving a liquid;

said receiving means including means for introducing a predetermined finite amount of impure water to be purified into said receiving means;

said receiving means further including holding means for accumulating and holding the partially purified water in the form of a body of water therein;

means for filtering the water prior to being introduced into said holding means to obtain partially purified water;

means for heating at least some of the partially purified water to a temperature to and about the boiling point thereof;

means for returning the partially purified heated water to said filtering means, which, in turn, filters and returns the water passing through said filter means to said holding means to begin a new heating and filtration cycle with attendant further purification of the partially purified water, said heating means being maintained activated until the degree of contamination of such water has dropped below a predetermined level; and means for selectively interrupting the flow of purified water of the body to said filtering means subsequent tot he completion of the purifying operation with attendant rise in the temperature of the water of the body to its boiling point and by continued heating convert a portion of such water into steam; wherein said receiving means has at least one discharge opening situated above said body of water for the discharge of the thus generated steam therethrough out of said vessel; and further comprising means for condensing the thus discharged steam received from said vessel into water and for collecting the condensed water in a collecting space for eventual use.

11. The arrangement as defined in claim 10, wherein said condensing means includes a receptacle vented to the atmosphere and which surrounds said vessel.

12. Apparatus for purifying water comprising:

a container for collecting and storing purified water;

filter means having an inlet for receiving water and an outlet for delivering water to said container whereby the water passing therebetween said inlet and outlet is filtered to remove contaminants;

said filters means being comprised of means for adsorbing and absorbing undesirable matter from the heated water passing through said filter means;

means for delivering water from said container to said filter means inlet;

selectively energizable means for heating and water preparatory to reentry in said inlet means of said filter means;

said container having venting means above said filter means to permit volatile matter emitted from said delivering means to be free to escape from said container during the purification operation;

said delivery means including means for returning water delivered from said filter means to said container back to the filter means inlet so long as said heat means is maintained energized to repeatedly pass the heated water through said filter means.

13. The water purification apparatus of claim 12 wherein said filter means comprises a substantially toroidal-shaped container defining a central opening and housing a filter medium surrounding said opening; said delivery means comprising a riser tube;

the central opening in said toroidal-shaped container being positioned to receive the upper end of said riser tube;

said toroidal-shaped container having openings along the top and bottom thereof to respectively define the filter means inlet and outlet, said toroidal-shaped container being easily removable and replaceable upon said riser tube;

means on said riser tube and engaging the lower portion of said toroidal-shaped container for supporting said toroidal-shaped container on said riser tube.

14. The water purification apparatus of claim 12 wherein said delivery means comprises a riser tube and further comprising bell means substantially enclosing said heating means, said bell means communicating with said container for receiving at least some of the collected water and delivering same to said riser tube upon heating thereof.

15. The water purification apparatus of claim 12 wherein said delivering means comprises a riser tube and said filter means surrounds said riser tube to receive heated water delivered to its inlet from said riser tube.

16. The water purification apparatus of claim 12 wherein said delivery means comprises a riser tube and further including vented lid means covering said container to permit egress of toxic contaminants and the like emitted from said riser tube.

17. The water purification apparatus of claim 12 further comprising means for energizing said heater means for an interval sufficient to permit repeated recirculation of water through the apparatus to assure that the water being purified achieves a predetermined purification level.

18. The water purification apparatus of claim 12 further comprising timer means for maintaining activation of the heating means for a predetermined time interval to achieve a predetermined purification level.

19. The water purification apparatus of claim 12 further comprising deflection means for deflecting water slugs and water vapor emitted from said delivery means tube, said deflection means including means for condensing the output of said delivery means to form drops which are uniformly distributed over the filter means inlet.

20. The water purification apparatus of claim 19 wherein said deflection means further includes a curved projection extending downwardly from the underside of said lid toward the outlet of the delivery means and being substantially aligned therewith, said projection curving gradually upwardly and outwardly from said delivery means, causing a film of water formed thereon to move radially outwardly in a substantially uniform manner about the said projection.

21. The water purification apparatus of claim 12 further comprising jet deflector means for deflecting water slugs and water vapor emitted from said delivery means outwardly along the surface of said deflector means to uniformly distribute the slugs and water vapor over the inlet of said filter means;

said deflector means including support means for supporting said deflector means upon said delivery means.

22. Apparatus for purifying water comprising:
a container for collecting and storing purified water;
filter means having an inlet for receiving water and an outlet for delivering water to said container whereby the water passing between said inlet and outlet is filtered to remove contaminants;
means for delivering water from said container to said filter means inlet;
means for heating said water preparatory to reentry in said inlet means of said filter means;
said delivery means including means for returning water delivered from said filter means to said container back to the filter means inlet so long as said heater means is maintained energized to repeatedly pass the heated water through said filter means;
said filter means being provided with a container enclosing said filter means, said container having a top, a bottom and a plurality of sides, one of said sides having an opening comprising the inlet of said filter means;
said top having an opening comprising the outlet of said filter means, said opening in said top being remote from said opening in said one of said sides.

23. Apparatus for purifying water comprising:
a vessel for collecting and storing purified water;
filter means having an inlet for receiving water and an outlet for delivering water to said vessel whereby the water passing between said inlet and outlet is filtered to remove contaminants;
means for delivering water from said vessel to said filter means inlet;
means for heating said water preparatory to reentry in said inlet means of said filter means;
said delivery means including means for returning water delivered from said filter means to said vessel back to the filter means inlet so long as said heater means is maintained energized to repeatedly pass the heated water through said filter means;
said filter means including a container for receiving and temporarily storing water slugs and water vapor delivered by said delivering means;
said filter means being positioned in said container and having an inlet along the bottom thereof whereby said filter means is filled with water as said container is filled;
said filter means outlet being coincident with an outlet opening provided in said container whereupon the water overflows the outlet opening in said container and returns to said vessel.

24. Apparatus for purifying water comprising:
a container for collecting and storing purified water;
filter means having an inlet for receiving water and an outlet for delivering water to said container whereby the water passing between said inlet and outlet is filtered to remove contaminants;
means for delivering water from said container to said filer means inlet;
means for heating said water preparatory to reentry in said inlet means of said filter means;
said delivery means including means for returning water delivered from said filter means to said container back to the filter means inlet so long as said heater means is maintained energized to repeatedly pass the heated water through said filter means;
said delivery means comprising a riser tube;
said heating means further comprising pump means associated with said riser tube for mechanically pumping the contents of the riser tube toward said filter means.

25. Apparatus for purifying water comprising:
a container for collecting and storing purified water;

filter means having an inlet for receiving water and an outlet for delivering water to said container whereby the water passing between said inlet and outlet is filtered to remove means for delivering water from each container to said filter means inlet;

means for heating said water preparatory to reentry in said inlet means of said filter means;

said delivery means including means for returning water delivered from said filter means to said container back to the filter means inlet so long as said heater means is maintained energized to repeatedly pass the heated water through said filter means;

control means for controlling the flow of water being introduced to the purification apparatus including detection means for operation said control means to terminate said flow of water when a predetermined quantity of water has been delivered to said vessel.

26. The water purification apparatus of claim 25 wherein said detection means comprises float operated switch means.

27. Apparatus for purifying water comprising:

a container comprising a lid for collecting and storing purified water;

filter means having an inlet for receiving water and an outlet for delivering water to said container whereby the water passing between said inlet and outlet is filtered to remove contaminants;

means for delivering water from said container to said filter means inlet;

means for heating said water preparatory to reentry in said inlet means of said filter means;

said delivery means including means for returning water delivered from said filer means to said container back to the filter means inlet so long as said heater means is maintained energized to repeatedly pass the heated water through said filter means;

deflection means for deflecting water slugs and water vapor emitted from said delivery means, said deflection means including means for condensing the output of said delivery means to form drops which are uniformly distributed over the filter means inlet;

said deflection means further including a curved projection extending downwardly from the underside of said lid toward the outlet of the delivery means and being substantially aligned therewith, said projection curving gradually upwardly and outwardly from said delivery means, causing a film of water formed thereon to move radially outwardly in a substantially uniform manner about the said projection;

said deflection means comprising a plurality of fins arranged at angularly spaced intervals about the underside of said lid and cooperating with a centrally downwardly depending projection which is substantially aligned with a longitudinal axis of said delivery means whereby the slugs and water vapor emitted from the delivery means are deflected upwardly and outwardly by said curved projection and are thereafter deflected downwardly by an associated one of said fins.

28. Apparatus for purifying water comprising:

a container for collecting and storing purified water;

filer means having an inlet for receiving water and an outlet for delivering water to said container whereby the water passing between said inlet and outlet is filtered to remove contaminants;

means for delivering water from said container to said filter means inlet;

means for heating said water preparatory to reentry in said inlet means of said filter means;

said delivery means including means for returning water delivered from said filter means to said container back to the filter means inlet so long as said heater means is maintained energized to repeatedly pass the heated water through said filer means;

a purified water storage container;

control means including timing means for terminating a purification cycle after a predetermined time interval;

means responsive to the termination of said purification cycle for transferring the contents of said vessel to said purified water storage container;

means responsive to substantial depletion of the purified water in said first-mentioned container after completion of a purification cycle for initiation of a new purification cycle including means enabling the transfer of water from a source of water to be purified and reinitiating said timer means, to provide substantially continuous delivery of purified water from said purified water storage container.

29. The water purification apparatus of claim 28 further comprising heat exchange means coupled between the source of water to be purified and the purification system and being in a heat transfer relationship with said purified water storage container for preheating the water to be purified prior to its delivery to said purification system.

30. The water purification apparatus of claim 28 further comprising detection means associated with said purified water storage container for initiating a purification cycle when the contents in the storage container drops to a predetermined level.

31. The water purification apparatus of claim 30 wherein said detection means comprises a float-operated switch.

32. An arrangement for purifying water, comprising receiving means for receiving water;

said receiving means including means for introducing water to be purified into said receiving means;

said receiving means further including holding means for accumulating and holding a body of water therein;

filtering means provided in said receiving means for filtering the water introduced into said receiving means prior to being introduced into said holding means to obtain partially purified water;

means for heating at least some of the water in said holding means to a temperature to and about the boiling point thereof;

means in said receiving means for returning the partially purified heated water to said filtering means, which, in turn, filters and returns the water passing through said filtering means to said holding means to begin a new heating and filtering cycle with attendant further purification of the partially purified water, said heating means being maintained activated until the degree of contamination of such water is dropped below a predetermined level;

said receiving means including venting means for enabling volatile matter in the water passing out of the returning means to freely pass through said venting means and into the atmosphere;

said filtering means comprising a first filter for filtering particulate from the water flowing through the filter means; and a second filter means adsorbing and absorbing impurities passing through said second filter means.

33. The arrangement of claim 32 wherein said second filter means is arranged upon said first filter means.

34. The arrangement of claim 32 wherein said first filter means comprises first and second filter layers; and said second filter means being positioned between said first and second filter layers.

* * * * *